(12) United States Patent
Jhang et al.

(10) Patent No.: US 10,502,930 B2
(45) Date of Patent: Dec. 10, 2019

(54) OPTICAL IMAGING LENS

(71) Applicant: Genius Electronic Optical (Xiamen) Co., Ltd., Fujian (CN)

(72) Inventors: Jia-Sin Jhang, Taichung (TW); Feng Li, Xiamen (CN); Huifeng Pan, Xiamen (CN)

(73) Assignee: Genius Electronic Optical (Xiamen) Co., Ltd., Xiamen, Fujian (CN)

( * ) Notice: Subject to any disclaimer, the term of this patent is extended or adjusted under 35 U.S.C. 154(b) by 155 days.

(21) Appl. No.: 15/619,313

(22) Filed: Jun. 9, 2017

(65) Prior Publication Data

US 2018/0314037 A1   Nov. 1, 2018

(30) Foreign Application Priority Data

Apr. 28, 2017   (CN) .......................... 2017 1 0293378

(51) Int. Cl.
*G02B 13/00* (2006.01)
*G02B 9/60* (2006.01)
*G02B 3/04* (2006.01)

(52) U.S. Cl.
CPC .......... *G02B 13/0045* (2013.01); *G02B 3/04* (2013.01); *G02B 9/60* (2013.01)

(58) Field of Classification Search
CPC . G02B 13/0045; G02B 27/0025; G02B 5/208
See application file for complete search history.

(56) References Cited

U.S. PATENT DOCUMENTS

2012/0087020 A1* 4/2012 Tang .................. G02B 13/0045
359/714

* cited by examiner

*Primary Examiner* — Joseph P Martinez
*Assistant Examiner* — V P
(74) *Attorney, Agent, or Firm* — James W. Huffman

(57) ABSTRACT

Present embodiments provide for an optical imaging lens. The optical imaging lens includes a first lens element, a second lens element, a third lens element, a fourth lens element, and a fifth lens element positioned sequentially from an object side to an image side. Through arrangement of convex or concave surfaces of the five lens elements, the length of the optical imaging lens may be shortened while providing better optical characteristics and imaging quality.

20 Claims, 21 Drawing Sheets

| Effective focal length (EFL) = 3.300 mm, HFOV (Half field of view) = 40.478 deg., TTL = 4.594 mm, Image height= 2.872 mm, Fno = 2.236 ||||||
| --- | --- | --- | --- | --- | --- | --- |
| Surface # | | Radius (mm) | Thickness / air gap (mm) | Refractive index | Abbe number | Focal length (mm) |
| - | Object | ∞ | | | | |
| 100 | Aperture stop | | -0.130 | | | |
| 111 | 1st lens element | 1.693 | 0.505 | 1.545 | 55.987 | 4.126 |
| 112 | | 6.081 | 0.324 | | | |
| 121 | 2nd lens element | -21.700 | 0.220 | 1.661 | 20.412 | -4.374 |
| 122 | | 3.385 | 0.080 | | | |
| 131 | 3rd lens element | 2.992 | 0.421 | 1.545 | 55.913 | 3.972 |
| 132 | | -7.524 | 0.328 | | | |
| 141 | 4th lens element | -1.298 | 0.593 | 1.545 | 55.987 | 2.561 |
| 142 | | -0.782 | 0.025 | | | |
| 151 | 5th lens element | 4.903 | 0.746 | 1.531 | 55.745 | -2.546 |
| 152 | | 1.007 | 0.700 | | | |
| 161 | IR cut filter | ∞ | 0.210 | 1.517 | 64.167 | |
| 162 | | ∞ | 0.442 | | | |
| 170 | Image plane | ∞ | 0.000 | | | |

FIG. 8

| | Aspherical parameters | | | | |
|---|---|---|---|---|---|
| Surface # | K | A2 | A4 | A6 | A8 |
| 111 | -1.889954E-01 | 0.000000E+00 | 4.627425E-02 | -3.773069E-01 | 1.417208E+00 |
| 112 | 4.814629E+00 | 0.000000E+00 | -5.156613E-02 | -2.089460E-01 | 4.527549E-01 |
| 121 | 0.000000E+00 | 0.000000E+00 | -3.534148E-01 | 5.021220E-01 | -1.088174E+00 |
| 122 | -7.552469E+01 | 0.000000E+00 | -3.615427E-01 | 7.166372E-01 | -9.829063E-01 |
| 131 | 0.000000E+00 | 0.000000E+00 | -4.464374E-01 | 8.141228E-01 | -1.059559E+00 |
| 132 | 0.000000E+00 | 0.000000E+00 | -1.579301E-01 | 1.231821E-01 | -1.199754E-01 |
| 141 | -1.610183E-01 | 0.000000E+00 | 0.000000E+00 | 0.000000E+00 | 0.000000E+00 |
| 142 | -2.939276E+00 | 0.000000E+00 | 0.000000E+00 | 0.000000E+00 | 0.000000E+00 |
| 151 | 1.306010E+00 | 0.000000E+00 | 0.000000E+00 | 0.000000E+00 | 0.000000E+00 |
| 152 | -6.313461E+00 | 0.000000E+00 | 0.000000E+00 | 0.000000E+00 | 0.000000E+00 |
| Surface # | A10 | A12 | A14 | A16 | |
| 111 | -2.567208E+00 | 5.312894E-01 | 3.888126E+00 | -3.602891E+00 | |
| 112 | -8.849185E-01 | -7.624613E-02 | 1.708437E+00 | -1.389870E+00 | |
| 121 | 1.035746E+00 | -9.288983E-01 | 1.607844E+00 | -1.152760E+00 | |
| 122 | 4.819025E-01 | 5.587920E-01 | -7.565630E-01 | 2.308242E-01 | |
| 131 | 7.301937E-01 | 3.618141E-02 | -5.241902E-01 | 2.515757E-01 | |
| 132 | 1.390623E-01 | -4.394022E-02 | -6.471237E-02 | 4.207458E-02 | |
| 141 | 0.000000E+00 | 0.000000E+00 | 0.000000E+00 | 0.000000E+00 | |
| 142 | 0.000000E+00 | 0.000000E+00 | 0.000000E+00 | 0.000000E+00 | |
| 151 | 0.000000E+00 | 0.000000E+00 | 0.000000E+00 | 0.000000E+00 | |
| 152 | 0.000000E+00 | 0.000000E+00 | 0.000000E+00 | 0.000000E+00 | |

FIG. 9

| Effective focal length (EFL) = 3.294 mm, HFOV (Half field of view) = 40.872 deg., TTL = 4.623 mm, Image height= 2.872 mm, Fno = 2.231 ||||||
|---|---|---|---|---|---|---|
| Surface # | | Radius (mm) | Thickness / air gap (mm) | Refractive index | Abbe number | Focal length (mm) |
| - | Object | | ∞ | | | |
| 200 | Aperture stop | | -0.130 | | | |
| 211 | 1st lens element | 1.781 | 0.484 | 1.545 | 55.987 | 4.567 |
| 212 | | 5.630 | 0.332 | | | |
| 221 | 2nd lens element | -46.960 | 0.228 | 1.661 | 20.412 | -3.739 |
| 222 | | 2.639 | 0.050 | | | |
| 231 | 3rd lens element | 3.336 | 0.565 | 1.545 | 55.913 | 3.160 |
| 232 | | -3.369 | 0.337 | | | |
| 241 | 4th lens element | -1.286 | 0.558 | 1.545 | 55.987 | 2.491 |
| 242 | | -0.763 | 0.295 | | | |
| 251 | 5th lens element | 3.482 | 0.422 | 1.531 | 55.745 | -2.330 |
| 252 | | 0.877 | 0.700 | | | |
| 261 | IR cut filter | ∞ | 0.210 | 1.517 | 64.167 | |
| 262 | | ∞ | 0.442 | | | |
| 270 | Image plane | ∞ | 0.000 | | | |

FIG. 12

| Aspherical parameters | | | | | |
|---|---|---|---|---|---|
| Surface # | K | A2 | A4 | A6 | A8 |
| 211 | -1.507632E-01 | 0.000000E+00 | 4.826442E-02 | -3.647897E-01 | 1.371337E+00 |
| 212 | 9.366307E+00 | 0.000000E+00 | -5.298439E-02 | -1.847275E-01 | 3.635670E-01 |
| 221 | 0.000000E+00 | 0.000000E+00 | -3.705573E-01 | 3.887688E-01 | -9.837832E-01 |
| 222 | -3.666493E+01 | 0.000000E+00 | -3.848673E-01 | 6.802747E-01 | -9.790740E-01 |
| 231 | 0.000000E+00 | 0.000000E+00 | -4.564209E-01 | 8.265391E-01 | -1.068147E+00 |
| 232 | 0.000000E+00 | 0.000000E+00 | -1.555163E-01 | 9.932541E-02 | -1.210028E-01 |
| 241 | -6.695207E-02 | 0.000000E+00 | 0.000000E+00 | 0.000000E+00 | 0.000000E+00 |
| 242 | -2.942661E+00 | 0.000000E+00 | 0.000000E+00 | 0.000000E+00 | 0.000000E+00 |
| 251 | -7.961127E-02 | 0.000000E+00 | 0.000000E+00 | 0.000000E+00 | 0.000000E+00 |
| 252 | -4.812434E+00 | 0.000000E+00 | 0.000000E+00 | 0.000000E+00 | 0.000000E+00 |
| Surface # | A10 | A12 | A14 | A16 | |
| 211 | -2.473341E+00 | 5.387141E-01 | 3.727172E+00 | -3.497052E+00 | |
| 212 | -6.878633E-01 | -1.375986E-01 | 1.358207E+00 | -1.131832E+00 | |
| 221 | 1.075894E+00 | -1.070756E+00 | 1.540427E+00 | -1.135261E+00 | |
| 222 | 5.148418E-01 | 5.227606E-01 | -7.796229E-01 | 2.597058E-01 | |
| 231 | 7.055308E-01 | 4.927990E-02 | -4.990858E-01 | 2.488197E-01 | |
| 232 | 1.475163E-01 | -4.448250E-02 | -6.224343E-02 | 4.085453E-02 | |
| 241 | 0.000000E+00 | 0.000000E+00 | 0.000000E+00 | 0.000000E+00 | |
| 242 | 0.000000E+00 | 0.000000E+00 | 0.000000E+00 | 0.000000E+00 | |
| 251 | 0.000000E+00 | 0.000000E+00 | 0.000000E+00 | 0.000000E+00 | |
| 252 | 0.000000E+00 | 0.000000E+00 | 0.000000E+00 | 0.000000E+00 | |

FIG. 13

| Effective focal length (EFL) = 2.976 mm, HFOV (Half field of view) = 43.696 deg., TTL = 4.249 mm, Image height = 2.872 mm, Fno = 2.022 | | | | | | |
|---|---|---|---|---|---|---|
| Surface # | | Radius (mm) | Thickness / air gap (mm) | Refractive index | Abbe number | Focal length (mm) |
| - | Object | ∞ | | | | |
| 300 | Aperture stop | | -0.138 | | | |
| 311 | 1st lens element | 1.698 | 0.459 | 1.545 | 55.987 | 4.474 |
| 312 | | 5.026 | 0.289 | | | |
| 321 | 2nd lens element | -100.118 | 0.238 | 1.661 | 20.412 | -3.528 |
| 322 | | 2.413 | 0.036 | | | |
| 331 | 3rd lens element | 2.774 | 0.547 | 1.545 | 55.987 | 2.824 |
| 332 | | -3.233 | 0.355 | | | |
| 341 | 4th lens element | -1.297 | 0.512 | 1.545 | 55.987 | 1.708 |
| 342 | | -0.618 | 0.032 | | | |
| 351 | 5th lens element | 2.304 | 0.419 | 1.531 | 55.745 | -1.626 |
| 352 | | 0.590 | 0.700 | | | |
| 361 | IR cut filter | ∞ | 0.210 | 1.517 | 64.167 | |
| 362 | | ∞ | 0.454 | | | |
| 370 | Image plane | ∞ | 0.000 | | | |

FIG. 16

| Aspherical parameters | | | | |
|---|---|---|---|---|
| Surface # | K | A2 | A4 | A6 | A8 |
| 311 | 1.481311E+00 | 0.000000E+00 | 2.090421E-02 | -6.708327E-01 | 3.119267E+00 |
| 312 | -3.179207E+01 | 0.000000E+00 | -3.241284E-02 | -2.313922E-01 | 4.999266E-01 |
| 321 | 0.000000E+00 | 0.000000E+00 | -4.227972E-01 | 6.569106E-01 | -1.883315E+00 |
| 322 | -3.253289E+01 | 0.000000E+00 | -4.313796E-01 | 9.238422E-01 | -1.599461E+00 |
| 331 | 0.000000E+00 | 0.000000E+00 | -5.210404E-01 | 1.150668E+00 | -1.821556E+00 |
| 332 | 0.000000E+00 | 0.000000E+00 | -1.586317E-01 | 9.644347E-02 | -1.100820E-01 |
| 341 | -1.050787E-01 | 0.000000E+00 | 0.000000E+00 | 0.000000E+00 | 0.000000E+00 |
| 342 | -3.738231E+00 | 0.000000E+00 | 0.000000E+00 | 0.000000E+00 | 0.000000E+00 |
| 351 | -7.120978E-01 | 0.000000E+00 | 0.000000E+00 | 0.000000E+00 | 0.000000E+00 |
| 352 | -4.817660E+00 | 0.000000E+00 | 0.000000E+00 | 0.000000E+00 | 0.000000E+00 |
| Surface # | A10 | A12 | A14 | A16 | |
| 311 | -8.570311E+00 | 1.209630E+01 | -7.779355E+00 | 1.120570E+00 | |
| 312 | -1.365464E+00 | 1.305237E+00 | -8.368389E-02 | -5.264691E-01 | |
| 321 | 2.129045E+00 | -1.720063E-01 | -9.748706E-01 | 3.231804E-01 | |
| 322 | 1.161049E+00 | 4.889790E-01 | -1.098833E+00 | 3.979543E-01 | |
| 331 | 1.571170E+00 | -3.674846E-01 | -5.622694E-01 | 3.518243E-01 | |
| 332 | 2.350279E-01 | -1.708517E-01 | -9.675588E-03 | 4.310514E-02 | |
| 341 | 0.000000E+00 | 0.000000E+00 | 0.000000E+00 | 0.000000E+00 | |
| 342 | 0.000000E+00 | 0.000000E+00 | 0.000000E+00 | 0.000000E+00 | |
| 351 | 0.000000E+00 | 0.000000E+00 | 0.000000E+00 | 0.000000E+00 | |
| 352 | 0.000000E+00 | 0.000000E+00 | 0.000000E+00 | 0.000000E+00 | |

FIG. 17

| Effective focal length (EFL) = 3.132 mm, HFOV (Half field of view) = 42.464 deg., TTL = 4.390 mm, Image height= 2.872 mm, Fno = 2.145 ||||||
|---|---|---|---|---|---|---|
| Surface # | | Radius (mm) | Thickness / air gap (mm) | Refractive index | Abbe number | Focal length (mm) |
| - | Object | | ∞ | | | |
| 400 | Aperture stop | | -0.142 | | | |
| 411 | 1st lens element | 1.691 | 0.462 | 1.545 | 55.987 | 4.219 |
| 412 | | 5.741 | 0.399 | | | |
| 421 | 2nd lens element | -16.991 | 0.221 | 1.661 | 20.412 | -3.622 |
| 422 | | 2.832 | 0.040 | | | |
| 431 | 3rd lens element | 3.321 | 0.459 | 1.545 | 55.913 | 3.257 |
| 432 | | -3.651 | 0.313 | | | |
| 441 | 4th lens element | -1.245 | 0.552 | 1.545 | 55.987 | 1.926 |
| 442 | | -0.660 | 0.050 | | | |
| 451 | 5th lens element | 2.271 | 0.430 | 1.531 | 55.745 | -2.001 |
| 452 | | 0.678 | 0.700 | | | |
| 461 | IR cut filter | ∞ | 0.210 | 1.517 | 64.167 | |
| 462 | | ∞ | 0.553 | | | |
| 470 | Image plane | ∞ | 0.000 | | | |

FIG. 20

| Aspherical parameters | | | | | |
|---|---|---|---|---|---|
| Surface # | K | A2 | A4 | A6 | A8 |
| 411 | -3.398389E-01 | 0.000000E+00 | 4.110315E-02 | -3.759447E-01 | 1.405021E+00 |
| 412 | -4.684162E-01 | 0.000000E+00 | -5.491200E-02 | -2.181433E-01 | 4.543017E-01 |
| 421 | 0.000000E+00 | 0.000000E+00 | -3.990806E-01 | 4.679231E-01 | -1.127285E+00 |
| 422 | -3.258991E+01 | 0.000000E+00 | -4.191166E-01 | 7.291103E-01 | -9.775949E-01 |
| 431 | 0.000000E+00 | 0.000000E+00 | -4.567801E-01 | 8.041632E-01 | -1.054125E+00 |
| 432 | 0.000000E+00 | 0.000000E+00 | -1.786310E-01 | 1.091458E-01 | -1.128592E-01 |
| 441 | -1.349935E-01 | 0.000000E+00 | 0.000000E+00 | 0.000000E+00 | 0.000000E+00 |
| 442 | -3.034859E+00 | 0.000000E+00 | 0.000000E+00 | 0.000000E+00 | 0.000000E+00 |
| 451 | -7.108986E-01 | 0.000000E+00 | 0.000000E+00 | 0.000000E+00 | 0.000000E+00 |
| 452 | -4.941073E+00 | 0.000000E+00 | 0.000000E+00 | 0.000000E+00 | 0.000000E+00 |
| Surface # | A10 | A12 | A14 | A16 | |
| 411 | -2.579331E+00 | 5.181020E-01 | 3.882995E+00 | -3.625337E+00 | |
| 412 | -9.026539E-01 | -9.544608E-02 | 1.708567E+00 | -1.365139E+00 | |
| 421 | 1.021496E+00 | -9.141620E-01 | 1.656560E+00 | -1.122072E+00 | |
| 422 | 4.774738E-01 | 5.551573E-01 | -7.577474E-01 | 2.287418E-01 | |
| 431 | 7.457397E-01 | 5.044502E-02 | -5.233541E-01 | 2.485588E-01 | |
| 432 | 1.469864E-01 | -3.927739E-02 | -6.270675E-02 | 4.228204E-02 | |
| 441 | 0.000000E+00 | 0.000000E+00 | 0.000000E+00 | 0.000000E+00 | |
| 442 | 0.000000E+00 | 0.000000E+00 | 0.000000E+00 | 0.000000E+00 | |
| 451 | 0.000000E+00 | 0.000000E+00 | 0.000000E+00 | 0.000000E+00 | |
| 452 | 0.000000E+00 | 0.000000E+00 | 0.000000E+00 | 0.000000E+00 | |

FIG. 21

| Effective focal length (EFL) = 4.243 mm, HFOV (Half field of view) = 35.396 deg., TTL = 5.726 mm, Image height= 2.872 mm, Fno = 2.886 | | | | | | |
|---|---|---|---|---|---|---|
| Surface # | | Radius (mm) | Thickness / air gap (mm) | Refractive index | Abbe number | Focal length (mm) |
| - | Object | | ∞ | | | |
| 500 | Aperture stop | | -0.131 | | | |
| 511 | 1st lens element | 1.891 | 0.629 | 1.545 | 55.987 | 4.513 |
| 512 | | 7.160 | 0.400 | | | |
| 521 | 2nd lens element | -97.977 | 0.273 | 1.661 | 20.412 | -5.336 |
| 522 | | 3.699 | 0.063 | | | |
| 531 | 3rd lens element | 7.218 | 0.608 | 1.545 | 55.913 | 8.506 |
| 532 | | -12.682 | 0.385 | | | |
| 541 | 4th lens element | -3.253 | 1.070 | 1.545 | 55.987 | 1.382 |
| 542 | | -0.684 | 0.106 | | | |
| 551 | 5th lens element | 6.776 | 0.313 | 1.531 | 55.745 | -1.389 |
| 552 | | 0.656 | 0.700 | | | |
| 561 | IR cut filter | ∞ | 0.210 | 1.517 | 64.167 | |
| 562 | | ∞ | 0.969 | | | |
| 570 | Image plane | ∞ | 0.000 | | | |

FIG. 24

| Aspherical parameters | | | | |
|---|---|---|---|---|
| Surface # | K | A2 | A4 | A6 | A8 |
| 511 | -4.011363E-01 | 0.000000E+00 | 1.830695E-02 | -1.327262E-01 | 5.294174E-01 |
| 512 | 5.982485E+01 | 0.000000E+00 | -7.870398E-02 | -7.369092E-02 | -1.340436E-02 |
| 521 | 0.000000E+00 | 0.000000E+00 | -2.160137E-01 | 3.011840E-02 | -4.100578E-01 |
| 522 | -5.077660E+01 | 0.000000E+00 | -1.753747E-01 | 4.030901E-01 | -8.652621E-01 |
| 531 | 0.000000E+00 | 0.000000E+00 | -2.574350E-01 | 7.767536E-01 | -1.259821E+00 |
| 532 | 0.000000E+00 | 0.000000E+00 | -2.044219E-01 | 1.975915E-01 | -1.341699E-01 |
| 541 | -2.538413E+01 | 0.000000E+00 | 0.000000E+00 | 0.000000E+00 | 0.000000E+00 |
| 542 | -3.971398E+00 | 0.000000E+00 | 0.000000E+00 | 0.000000E+00 | 0.000000E+00 |
| 551 | 7.490566E+00 | 0.000000E+00 | 0.000000E+00 | 0.000000E+00 | 0.000000E+00 |
| 552 | -5.155143E+00 | 0.000000E+00 | 0.000000E+00 | 0.000000E+00 | 0.000000E+00 |
| Surface # | A10 | A12 | A14 | A16 | |
| 511 | -1.118653E+00 | 7.436366E-01 | 6.607631E-01 | -8.828287E-01 | |
| 512 | 6.207810E-03 | -2.334680E-01 | 4.135896E-01 | -2.463462E-01 | |
| 521 | 9.526629E-01 | -1.424413E+00 | 1.507968E+00 | -6.076674E-01 | |
| 522 | 5.090613E-01 | 5.235866E-01 | -7.404078E-01 | 2.602023E-01 | |
| 531 | 7.917835E-01 | 1.819830E-01 | -4.429309E-01 | 1.370151E-01 | |
| 532 | 8.653900E-02 | 6.997475E-03 | -3.512944E-02 | 1.042840E-02 | |
| 541 | 0.000000E+00 | 0.000000E+00 | 0.000000E+00 | 0.000000E+00 | |
| 542 | 0.000000E+00 | 0.000000E+00 | 0.000000E+00 | 0.000000E+00 | |
| 551 | 0.000000E+00 | 0.000000E+00 | 0.000000E+00 | 0.000000E+00 | |
| 552 | 0.000000E+00 | 0.000000E+00 | 0.000000E+00 | 0.000000E+00 | |

FIG. 25

| Effective focal length (EFL) = 4.423 mm, HFOV (Half field of view) = 32.670 deg., TTL = 5.793 mm, Image height= 2.872 mm, Fno = 2.989 |||||||
|---|---|---|---|---|---|---|
| Surface # | | Radius (mm) | Thickness / air gap (mm) | Refractive index | Abbe number | Focal length (mm) |
| - | Object | | ∞ | | | |
| 611 | 1st lens element | 1.448 | 0.650 | 1.545 | 55.987 | 4.018 |
| 612 | | 3.583 | 0.273 | | | |
| 600 | Aperture stop | | 0.154 | | | |
| 621 | 2nd lens element | -6.147 | 0.297 | 1.661 | 20.412 | -8.704 |
| 622 | | 107.117 | 0.299 | | | |
| 631 | 3rd lens element | -1.583 | 0.711 | 1.545 | 55.913 | 7.472 |
| 632 | | -1.322 | 0.523 | | | |
| 641 | 4th lens element | 5.705 | 0.750 | 1.545 | 55.987 | 3.490 |
| 642 | | -2.730 | 0.030 | | | |
| 651 | 5th lens element | -2.764 | 0.585 | 1.531 | 55.745 | -2.643 |
| 652 | | 3.083 | 0.500 | | | |
| 661 | IR cut filter | ∞ | 0.210 | 1.517 | 64.167 | |
| 662 | | ∞ | 0.811 | | | |
| 670 | Image plane | ∞ | 0.000 | | | |

FIG. 28

| | Aspherical parameters | | | | |
|---|---|---|---|---|---|
| Surface # | K | A2 | A4 | A6 | A8 |
| 611 | 0.000000E+00 | 0.000000E+00 | 2.568623E-02 | 3.928369E-02 | -2.803758E-02 |
| 612 | 0.000000E+00 | 0.000000E+00 | 4.004669E-02 | 3.380006E-02 | -2.948280E-02 |
| 621 | 0.000000E+00 | 0.000000E+00 | -5.744725E-03 | -6.497099E-02 | -2.357351E-01 |
| 622 | 0.000000E+00 | 0.000000E+00 | 1.135927E-01 | -3.063496E-02 | -6.157924E-02 |
| 631 | 0.000000E+00 | 0.000000E+00 | 1.350641E-02 | -5.517702E-02 | 7.410909E-02 |
| 632 | 0.000000E+00 | 0.000000E+00 | -3.221673E-02 | -1.585215E-02 | 2.915762E-02 |
| 641 | 0.000000E+00 | 0.000000E+00 | -8.060384E-02 | 1.045983E-02 | 3.264132E-03 |
| 642 | 0.000000E+00 | 0.000000E+00 | 3.317319E-02 | -1.483318E-02 | 5.716183E-03 |
| 651 | 0.000000E+00 | 0.000000E+00 | 4.526601E-02 | -7.129715E-03 | 1.385213E-03 |
| 652 | 0.000000E+00 | 0.000000E+00 | -4.892792E-02 | 6.183360E-03 | -7.508564E-04 |
| Surface # | A10 | A12 | A14 | A16 | |
| 611 | 4.166181E-02 | 0.000000E+00 | 0.000000E+00 | 0.000000E+00 | |
| 612 | -3.528179E-02 | 0.000000E+00 | 0.000000E+00 | 0.000000E+00 | |
| 621 | -1.043232E-01 | 0.000000E+00 | 0.000000E+00 | 0.000000E+00 | |
| 622 | 1.422266E-02 | 0.000000E+00 | 0.000000E+00 | 0.000000E+00 | |
| 631 | 8.523919E-03 | 0.000000E+00 | 0.000000E+00 | 0.000000E+00 | |
| 632 | -2.335764E-02 | 0.000000E+00 | 0.000000E+00 | 0.000000E+00 | |
| 641 | -5.214597E-04 | 0.000000E+00 | 0.000000E+00 | 0.000000E+00 | |
| 642 | -4.745849E-04 | 0.000000E+00 | 0.000000E+00 | 0.000000E+00 | |
| 651 | -5.458967E-05 | 0.000000E+00 | 0.000000E+00 | 0.000000E+00 | |
| 652 | 3.619108E-05 | 0.000000E+00 | 0.000000E+00 | 0.000000E+00 | |

FIG. 29

| Embodiment | 1st | 2nd | 3rd | 4th | 5th | 6th |
|---|---|---|---|---|---|---|
| T1 | 0.505 | 0.484 | 0.459 | 0.462 | 0.629 | 0.650 |
| G12 | 0.324 | 0.332 | 0.289 | 0.399 | 0.400 | 0.427 |
| T2 | 0.220 | 0.228 | 0.238 | 0.221 | 0.273 | 0.297 |
| G23 | 0.080 | 0.050 | 0.036 | 0.040 | 0.063 | 0.299 |
| T3 | 0.421 | 0.565 | 0.547 | 0.459 | 0.608 | 0.711 |
| G34 | 0.328 | 0.337 | 0.355 | 0.313 | 0.385 | 0.523 |
| T4 | 0.593 | 0.558 | 0.512 | 0.552 | 1.070 | 0.750 |
| G45 | 0.025 | 0.295 | 0.032 | 0.050 | 0.106 | 0.030 |
| T5 | 0.746 | 0.422 | 0.419 | 0.430 | 0.313 | 0.585 |
| G5F | 0.700 | 0.700 | 0.700 | 0.700 | 0.700 | 0.500 |
| TF | 0.210 | 0.210 | 0.210 | 0.210 | 0.210 | 0.210 |
| GFP | 0.442 | 0.442 | 0.454 | 0.553 | 0.969 | 0.811 |
| AAG | 0.758 | 1.014 | 0.711 | 0.801 | 0.954 | 1.279 |
| ALT | 2.485 | 2.257 | 2.174 | 2.125 | 2.893 | 2.993 |
| BFL | 1.352 | 1.352 | 1.364 | 1.463 | 1.879 | 1.521 |
| TTL | 4.594 | 4.623 | 4.249 | 4.390 | 5.726 | 5.793 |
| TL | 3.243 | 3.271 | 2.885 | 2.926 | 3.847 | 4.272 |
| EFL | 3.300 | 3.294 | 2.976 | 3.132 | 4.243 | 4.423 |
| TTL/BFL | 3.398 | 3.420 | 3.115 | 3.000 | 3.047 | 3.808 |
| TL/G12 | 9.999 | 9.852 | 9.999 | 7.340 | 9.616 | 9.999 |
| TTL/T4 | 7.749 | 8.281 | 8.300 | 7.947 | 5.350 | 7.727 |
| TL/BFL | 2.398 | 2.420 | 2.115 | 2.000 | 2.047 | 2.808 |
| EFL/T4 | 5.566 | 5.899 | 5.813 | 5.670 | 3.964 | 5.899 |
| (T4+G45+T5)/T4 | 2.300 | 2.285 | 1.881 | 1.869 | 1.391 | 1.820 |
| G12/T2 | 1.473 | 1.457 | 1.213 | 1.800 | 1.466 | 1.438 |
| T5/G12 | 2.299 | 1.271 | 1.453 | 1.079 | 0.782 | 1.368 |
| ALT/T5 | 3.333 | 5.350 | 5.187 | 4.939 | 9.252 | 5.119 |
| TL/G34 | 9.888 | 9.711 | 8.138 | 9.360 | 10.000 | 8.169 |
| AAG/T1 | 1.500 | 2.094 | 1.550 | 1.734 | 1.518 | 1.967 |
| AAG/T3 | 1.799 | 1.797 | 1.300 | 1.745 | 1.569 | 1.800 |
| AAG/G34 | 2.311 | 3.011 | 2.005 | 2.562 | 2.480 | 2.446 |
| EFL/T1 | 6.534 | 6.800 | 6.489 | 6.779 | 6.747 | 6.800 |
| (T2+G23+T3)/T1 | 1.429 | 1.739 | 1.788 | 1.559 | 1.502 | 2.009 |
| (T2+G23+T3)/T3 | 1.714 | 1.492 | 1.500 | 1.569 | 1.553 | 1.839 |
| (T2+G23+T3)/G34 | 2.201 | 2.501 | 2.313 | 2.304 | 2.455 | 2.499 |
| (T4+G45+T5)/T1 | 2.700 | 2.634 | 2.100 | 2.235 | 2.368 | 2.098 |
| ALT/T1 | 4.920 | 4.660 | 4.741 | 4.600 | 4.600 | 4.601 |

FIG. 30

OPTICAL IMAGING LENS

CROSS REFERENCE TO RELATED APPLICATION

The present application claims priority to P.R.C. Patent Application No. 201710293378.9 titled OPTICAL IMAGING LENS, filed Apr. 28, 2017, with the State Intellectual Property Office of the People's Republic of China (SIPO), which is incorporated herein in its entirety.

TECHNICAL FIELD

The present disclosure relates to an optical imaging lens, and particularly, to an optical imaging lens having five lens elements.

BACKGROUND

Technology for mobile electronic devices is improving constantly and consumers' demands for compact electronic devices haven't decreased. Key components of an optical imaging lens for a consumer electronic product should keep pace with technological improvements in order to meet the expectations of consumers. In addition to good imaging quality and a compact size, an optical imaging lens should preferably have a large field of view and a large aperture size. Consumers demand for imaging quality have increased with continued improvements to optical imaging lenses. Therefore, in addition to maintaining a small size of an optical imaging lens, the optical imaging lens should provide for good imaging quality and performance qualities.

To preserve good imaging quality, the materials of the optical imaging lens and manufacturing yield should be considered when reducing the size of the optical imaging lens. In this manner, there is a desirable objective for satisfying consumers' demands when increasing a good imaging quality.

SUMMARY

The present disclosure provides for an optical imaging lens. By designing the convex and/or concave surfaces of the five lens elements, the amounts of light entering the optical imaging lens may be increased and the size of the optical imaging lens may be decreased.

In the present disclosure, parameters used herein may be chosen from but not limited to parameters listed below:

| Parameter | Definition |
| --- | --- |
| T1 | A central thickness of a first lens element along an optical axis |
| G12 | An air gap between a first lens element and a second lens element along an optical axis |
| T2 | A central thickness of a second lens element along an optical axis |
| G23 | An air gap between a second lens element and a third lens element along an optical axis |
| T3 | A central thickness of a third lens element along an optical axis |
| G34 | An air gap between a third lens element and a fourth lens element along an optical axis |
| T4 | A central thickness of a fourth lens element along an optical axis |
| G45 | An air gap between a fourth lens element and a fifth lens element along a optical axis |
| T5 | A central thickness of a fifth lens element along an optical axis |
| G5F | An air gap between a fifth lens element and a filtering unit along an optical axis |
| TF | A central thickness of a filtering unit along an optical axis |
| GFP | An air gap between a filtering unit and an image plane along an optical axis |
| f1 | A focusing length of a first lens element |
| f2 | A focusing length of a second lens element |
| f3 | A focusing length of a third lens element |
| f4 | A focusing length of a fourth lens element |
| f5 | A focusing length of a fifth lens element |
| n1 | A refracting index of a first lens element |
| n2 | A refracting index of a second lens element |
| n3 | A refracting index of a third lens element |
| n4 | A refracting index of a fourth lens element |
| n5 | A refracting index of a fifth lens element |
| v1 | An Abbe number of a first lens element |
| v2 | An Abbe number of a second lens element |
| v3 | An Abbe number of a third lens element |
| v4 | An Abbe number of a fourth lens element |
| v5 | An Abbe number of a fifth lens element |
| HFOV | Half Field of View of an optical imaging lens |
| Fno | F-number of an optical imaging lens |
| EFL | An effective focal length of an optical imaging lens |
| TTL | A distance from an object-side surface of a first lens element to an image plane along an optical axis |
| ALT | A sum of a central thicknesses from a first lens element to a fifth lens element |
| AAG | A sum of all air gaps from a first lens element to a fifth lens element along an optical axis |
| BFL | A back focal length of an optical imaging lens/A distance from an image-side surface of a fifth lens element to an image plane along an optical axis |
| TL | A distance from an object-side surface of a first lens element to an image-side surface of a fifth lens element along an optical axis |

According to one embodiment of the present disclosure, an optical imaging lens may comprise sequentially from an object side to an image side along an optical axis, a first lens element, a second lens element, a third lens element, a fourth lens element, and a fifth lens element. Each of the first, second, third, fourth, and fifth lens elements may have varying refracting power in some embodiments. Additionally, each of the first, second, third, fourth, and fifth lens elements may comprise an object-side surface facing toward the object side, an image-side surface facing toward the image side, and a central thickness defined along an optical axis. Moreover, an image-side surface of a first lens element may comprise a concave portion in a vicinity of the optical axis, the second lens element may have negative refracting power, and the object-side surface of the second lens element may comprise a concave portion in a vicinity of the optical axis, the third lens element may have positive refracting power and the image-side surface of the third lens element may comprise a convex portion in a vicinity of the optical axis and the object-side surface of the third lens element may have a concave portion in a vicinity of a periphery of the third lens element, the fourth lens element may have positive refracting power and the object-side surface of the fourth lens element may comprise a convex portion in a vicinity of a periphery of the fourth lens element, the image-side surface of the fifth lens element may comprise a concave portion in a vicinity of the optical axis; and the optical imaging lens may comprise no other lenses having refracting power beyond the first to the fifth lens elements.

According to one embodiment of the present disclosure, an optical imaging lens may comprise sequentially from an object side to an image side along an optical axis, a first, second, third, fourth, and fifth lens elements. Each of the first, second, third, fourth, and fifth lens elements may have varying refracting power in some embodiments. Additionally, each of the first, second, third, fourth, and fifth lens elements may comprise an object-side surface facing toward the object side, an image-side surface facing toward the image side, and a central thickness defined along the optical axis. Moreover, the image-side surface of the first lens element may comprise a concave portion in a vicinity of the optical axis, the object-side surface of the second lens element may comprise a concave portion in a vicinity of the optical axis, the third lens element may have positive refracting power, the object-side surface of the third lens element may comprise a concave portion in a vicinity of a periphery of the third lens element, the image-side surface of the third lens element may comprise a convex portion in a vicinity of the optical axis, the fourth lens element may have positive refracting power and the object-side surface of the fourth lens element may comprise a convex portion in a vicinity of a periphery of the fourth lens element, the image-side surface of the fifth lens element may have a concave portion in a vicinity of the optical axis and a convex portion in a vicinity of a periphery of the fifth lens element, and the optical imaging lens may comprise no other lenses having refracting power beyond the first to the fifth lens elements.

According to one embodiment of the present disclosure, an optical imaging lens may comprise sequentially from an object side to an image side along an optical axis, a first, second, third, fourth, and fifth lens elements. Each of the first, second, third, fourth, and fifth lens elements may have varying refracting power in some embodiments. Additionally, each of the first, second, third, fourth, and fifth lens elements may comprise an object-side surface facing toward the object side, an image-side surface facing toward the image side, and a central thickness defined along the optical axis. Moreover, the image-side surface of the first lens element may comprise a concave portion in a vicinity of the optical axis, the object-side surface of the second lens element may comprise a concave portion in a vicinity of the optical axis, the image-side surface of the second lens element may comprise a concave portion in a vicinity of the optical axis, the third lens element may have positive refracting power, and the image-side surface of the third lens element may comprise a convex portion in a vicinity of the optical axis, the fourth lens element may have positive refracting power, the image-side surface of the fifth lens element may comprise concave portion in a vicinity of the optical axis, and the optical imaging lens may comprise no other lenses having refracting power beyond the first to the fifth lens elements and the optical imaging lens satisfies inequalities as follows:

$TTL/BFL \leq 3.900$  Inequality (1); and $TL/G12 \leq 10.000$  Inequality (2).

One embodiment of the optical imaging lens may satisfy any one of inequalities as follows:

$(T2+G23+T3)/T1 \leq 2.100$  Inequality (3);

$AAG/T3 \leq 1.800$  Inequality (4);

$(T4+G45+T5)/T4 \leq 2.300$  Inequality (5);

$EFL/T1 \leq 6.800$  Inequality (6);

$ALT/T5 \leq 10.000$  Inequality (7);

$TL/G34 \leq 10.000$  Inequality (8);

$(T2+G23+T3)/T3 \leq 1.900$  Inequality (9);

$AAG/G34 \leq 3.300$  Inequality (10);

$(T4+G45+T5)/T1 \leq 2.700$  Inequality (11);

$EFL/T4 \leq 5.900$  Inequality (12);

$ALT/T1 \leq 5.200$  Inequality (13);

$TL/BFL \leq 6.400$  Inequality (14);

$(T2+G23+T3)/G34 \leq 2.500$  Inequality (15);

$AAG/T1 \leq 2.600$  Inequality (16);

$TTL/T4 \leq 8.300$  Inequality (17);

$G12/T2 \leq 1.800$  Inequality (18); and $T5/G12 \leq 2.300$  Inequality (19).

BRIEF DESCRIPTION OF THE DRAWINGS

Exemplary embodiments will be more readily understood from the following detailed description when read in conjunction with the appended drawing, in which:

FIG. 8 depicts a table of optical data for each lens element of an optical imaging lens of a first embodiment of the present disclosure;

FIG. 9 depicts a table of aspherical data of a first embodiment of an optical imaging lens according to the present disclosure;

FIG. 12 depicts a table of optical data for each lens element of an optical imaging lens of a second embodiment of the present disclosure;

FIG. 13 depicts a table of aspherical data of a second embodiment of the optical imaging lens according to the present disclosure;

FIG. 16 depicts a table of optical data for each lens element of the optical imaging lens of a third embodiment of the present disclosure;

FIG. 17 depicts a table of aspherical data of a third embodiment of the optical imaging lens according to the present disclosure;

FIG. 20 depicts a table of optical data for each lens element of an optical imaging lens of a fourth embodiment of the present disclosure;

FIG. 21 depicts a table of aspherical data of a fourth embodiment of the optical imaging lens according to the present disclosure;

FIG. 24 depicts a table of optical data for each lens element of the optical imaging lens of a fifth embodiment of the present disclosure;

FIG. 25 depicts a table of aspherical data of a fifth embodiment of the optical imaging lens according to the present disclosure;

FIG. 28 depicts a table of optical data for each lens element of a sixth embodiment of an optical imaging lens according to the present disclosure;

FIG. 29 depicts a table of aspherical data of a sixth embodiment of the optical imaging lens according to the present disclosure;

FIG. 30 is a value table reflecting determined values of T1, G12, T2, G23, T3, G34, T4, G45, T5, G5F, TF, GFP, AAG, ALT, BFL, TTL, TL, EFL, TTL/BFL, TL/G12, TTL/T4, TL/BFL, EFL/T4, (T4+G45+T5)/T4, G12/T2, T5/G12, ALT/T5, TL/G34, AAG/T1, AAG/T3, AAG/G34, EFL/T1, (T2+G23+T3)/T1, (T2+G23+T3)/T3, (T2+G23+T3)/G34, (T4+G45+T5)/T1, ALT/T1 as determined in specific example embodiments.

DETAILED DESCRIPTION

Figure 2:
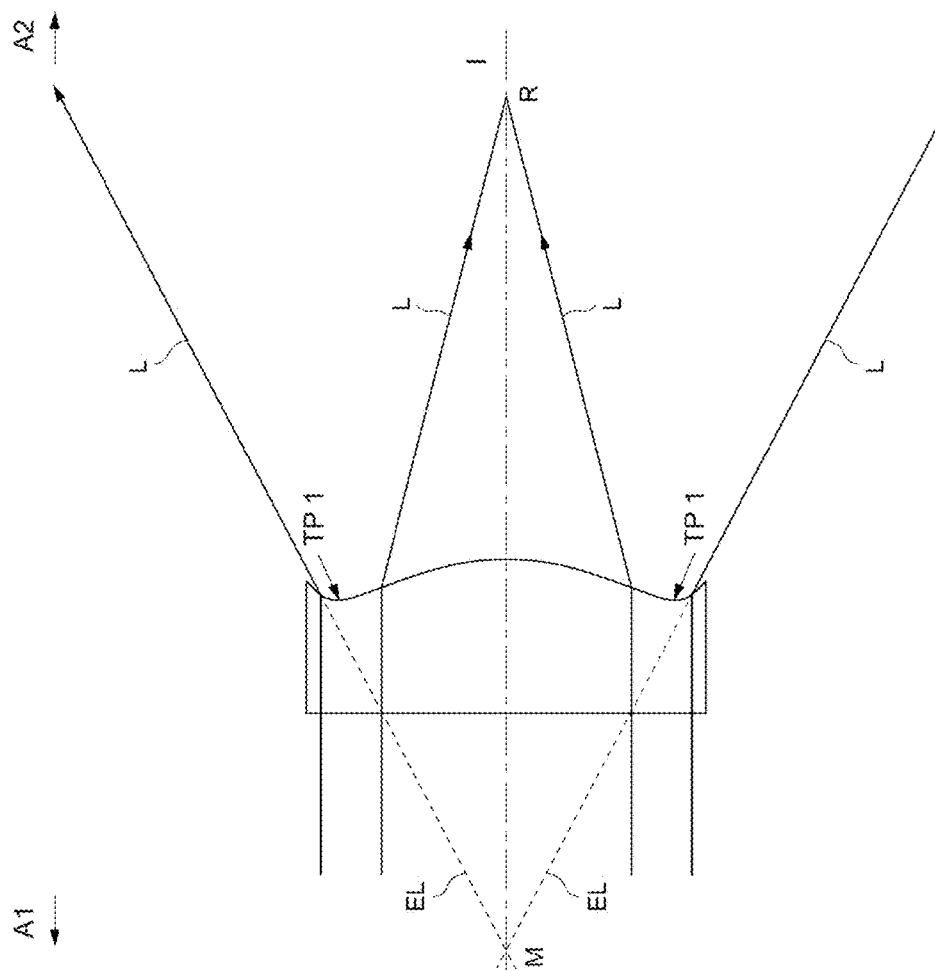
FIG. 2 depicts a schematic view of a relation between a surface shape and an optical focus of a lens element.

For a more complete understanding of the present disclosure and its advantages, reference is now made to the following description taken in conjunction with the accompanying drawings, in which like reference numbers indicate like features. Persons having ordinary skill in the art will understand other varieties for implementing example embodiments, including those described herein. The drawings are not limited to specific scale and similar reference numbers are used for representing similar elements. As used in the disclosures and the appended claims, the terms "example embodiment," "exemplary embodiment," and "present embodiment" do not necessarily refer to a single embodiment, although it may, and various example embodiments may be readily combined and interchanged, without departing from the scope or spirit of the present disclosure. Furthermore, the terminology as used herein is for the purpose of describing example embodiments only and is not intended to be a limitation of the disclosure. In this respect, as used herein, the term "in" may include "in" and "on," and the terms "a," "an," and "the" may include singular and plural references. Furthermore, as used herein, the term "by" may also mean "from," depending on the context. Furthermore, as used herein, the term "if" may also mean "when" or "upon," depending on the context. Furthermore, as used herein, the words "and/or" may refer to and encompass any and all possible combinations of one or more of the associated listed items.

In the present disclosure, the description "a lens element having positive refracting power (or negative refracting power)" may mean that a paraxial refracting power of the lens element in Gaussian optics is positive (or negative). The description "An object-side (or image-side) surface of a lens element" may include a specific region of that surface of the lens element where imaging rays are capable of passing through that region, namely the clear aperture of the surface. The aforementioned imaging rays can be classified into two types, namely a chief ray Lc and a marginal ray Lm. Taking a lens element depicted in FIG. 1 as an example, the lens element may be rotationally symmetric, where the optical axis I is the axis of symmetry. The region A of the lens element may be defined as "a part in a vicinity of the optical axis," and the region C of the lens element may be defined as "a part in a vicinity of a periphery of the lens element." Besides, the lens element may also have an extending part E extended radially and outwardly from the region C, namely the part outside of the clear aperture of the lens element. The extending part E may be used for physically assembling the lens element into an optical imaging lens system. Under normal circumstances, the imaging rays may not pass through the extending part E because those imaging rays may only pass through the clear aperture. The structures and shapes of the aforementioned extending part E are only examples for technical explanation, the structures and shapes of lens elements should not be limited to these examples. Note that the extending parts of the lens element surfaces depicted in the following embodiments may be partially omitted.

The following criteria are provided for determining the shapes and the parts of lens element surfaces set forth in the present disclosure. These criteria mainly determine the boundaries of parts under various circumstances including the part in a vicinity of the optical axis, the part in a vicinity of a periphery of a lens element surface, and/or other types of lens element surfaces such as those having multiple parts.

Figure 1:
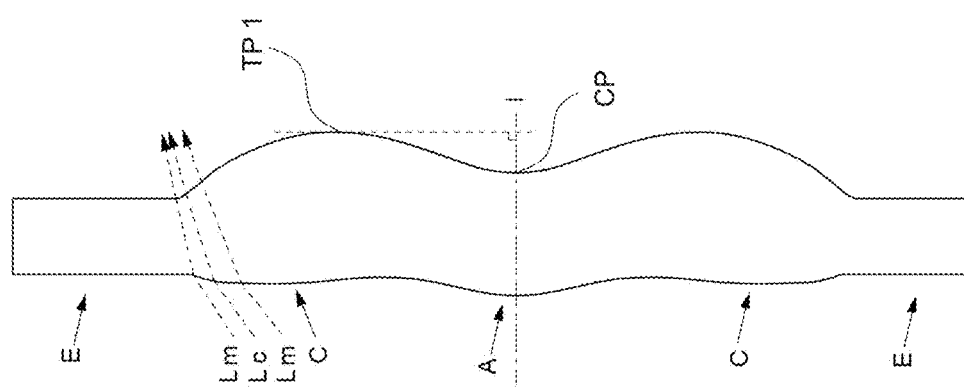
FIG. 1 depicts a cross-sectional view of one single lens element according to one embodiment of the present disclosure.

FIG. 1 depicts a radial cross-sectional view of a lens element. Before determining boundaries of those aforementioned portions, two referential points should be defined first, namely a central point CP and a transition point. The central point of a surface of a lens element may be a point of intersection of that surface and the optical axis I. The transition point may be a point on a surface of a lens element, where the tangent line of that point is perpendicular to the optical axis. Additionally, if multiple transition points appear on one single surface, then these transition points may be sequentially named along the radial direction of the surface with numbers starting from the first transition point. For instance, a first transition point TP1 (e.g., a transition point closest one to the optical axis), a second transition point, and a Nth transition point (e.g., a transition point farthest away from the optical axis within the scope of the clear aperture of the surface). The portion of a surface of the lens element between the central point CP and the first transition point TP1 may be defined as the portion in a vicinity of the optical axis. The portion located radially outside of the Nth transition point (but still within the scope of the clear aperture) may be defined as the portion in a vicinity of a periphery of the lens element. In some embodiments, there may be other portions existing between the portion in a vicinity of the optical axis and the portion in a vicinity of a periphery of the lens element; the numbers of portions may depend on the numbers of the transition point(s). In addition, the radius of the clear aperture (or a so-called effective radius) of a surface may be defined as the radial distance from the optical axis I to a point of intersection of the marginal ray Lm and the surface of the lens element.

Referring to FIG. 2, determining whether the shape of a portion is convex or concave may depend on whether a collimated ray L passing through that portion converges or diverges. That is, while applying a collimated ray L to a portion to be determined in terms of shape, the collimated ray L passing through that portion may be bended and the ray itself or its extension line EL may eventually meet the optical axis I. The shape of that portion may be determined by whether the ray or its extension line EL meets (intersects) the optical axis I (focal point) at the object-side A1 or image-side A2. For instance, if the ray itself intersects the optical axis I at the image side A2 of the lens element after passing through a portion, (i.e., the focal point of this ray is at the image side A2 (see point R in FIG. 2)), the portion may be determined as having a convex shape. On the contrary, if the ray diverges after passing through a portion, the extension line of the ray intersects the optical axis at the object side of the lens element, (i.e., the focal point of the ray is at the object side (see point M in FIG. 2)), that portion may be determined as having a concave shape. Therefore, referring to FIG. 2, the portion between the central point CP and the first transition point TP1 may have a convex shape, the portion located radially outside of the first transition point may have a concave shape, and the first transition point may be the point where the portion having a convex shape changes to the portion having a concave shape, namely the border of two adjacent portions. Alternatively, there may be another method to determine whether a portion in a vicinity of the optical axis may have a convex or concave shape by referring to the sign of an "R" value, which may be the (paraxial) radius of curvature of a lens surface. The R value may be used in conventional optical design software such as Zemax and CodeV. The R value usually appears in the lens data sheet in the software. For an object-side surface, positive R may mean that the object-side surface is convex, and negative R may mean that the object-side surface is concave. Conversely, for an image-side surface, positive R may mean that the image-side surface is concave, and negative R may mean that the image-side surface is convex. The result found by using this method should be consistent with the result found using the other way mentioned above, which may determine surface shapes by referring to whether the focal point of a collimated ray is at the object side or the image side.

Referring to a case where a transition point is absent, a portion in a vicinity of an optical axis may be defined as the portion between 0-50% of an effective radius (radius of the clear aperture) of a surface, whereas a portion in a vicinity of a periphery of the lens element may be defined as the portion between 50-100% of the effective radius (radius of the clear aperture) of the surface.

Figure 3:
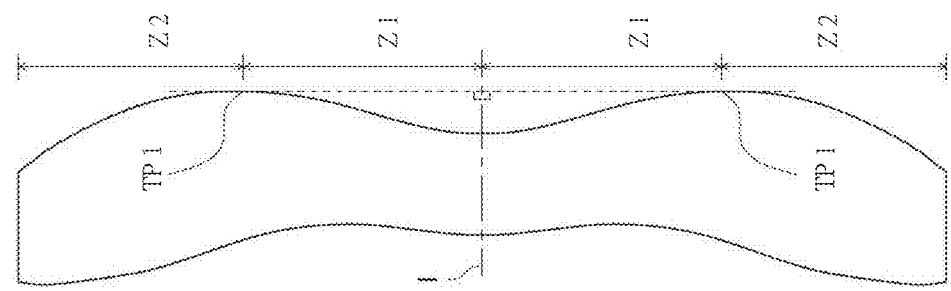
FIG. 3 depicts a schematic view of a first example of a surface shape and an effective radius of a lens element.

FIG. 3 illustrates a lens element having only one transition point, namely a first transition point within a clear aperture of an image-side surface of the lens element. Portion I may Z1 be a portion in a vicinity of the optical axis, and portion II Z2 may be a portion in a vicinity of a periphery of the lens element. The portion in a vicinity of the optical axis may be determined as having a concave surface due to the R value at the image-side surface of the lens element is positive. The shape of the portion in a vicinity of a periphery of the lens element may be different from that of the radially inner adjacent portion (i.e., the shape of the portion in a vicinity of a periphery of the lens element may be different from the shape of the portion in a vicinity of the optical axis); the portion in a vicinity of a periphery of the lens element may have a convex shape.

Figure 4:
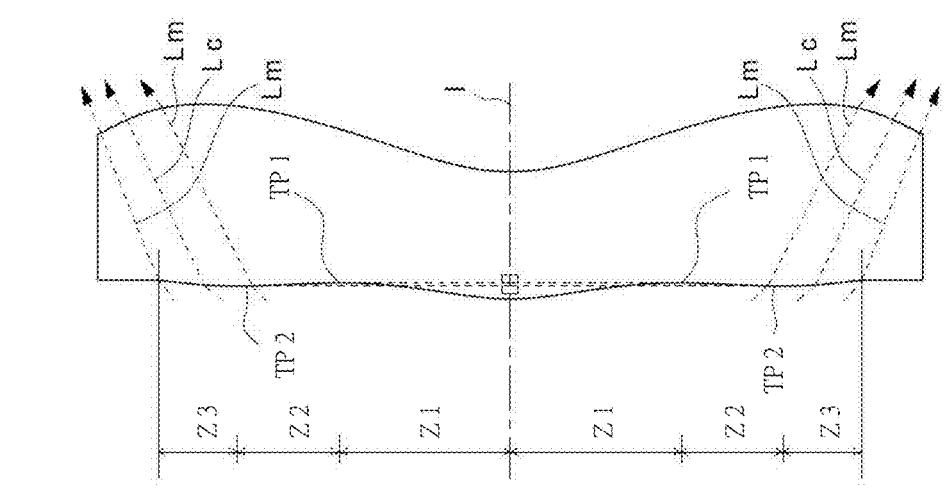
FIG. 4 depicts a schematic view of a second example of a surface shape and an effective radius of a lens element.

FIG. 4 illustrates a lens element having a first transition point and a second transition point TP2 on an object-side surface (within the clear aperture) of the lens element. Here, portion I Z1 may be the portion in a vicinity of the optical axis, and portion III Z3 may be the portion in a vicinity of a periphery of the lens element. The portion in a vicinity of the optical axis may have a convex shape because the R value at the object-side surface of the lens element may be positive. The portion in a vicinity of a periphery of the lens element (portion III) may have a convex shape. What is more, there may be another portion having a concave shape existing between the first and second transition point (portion II).

Figure 5:
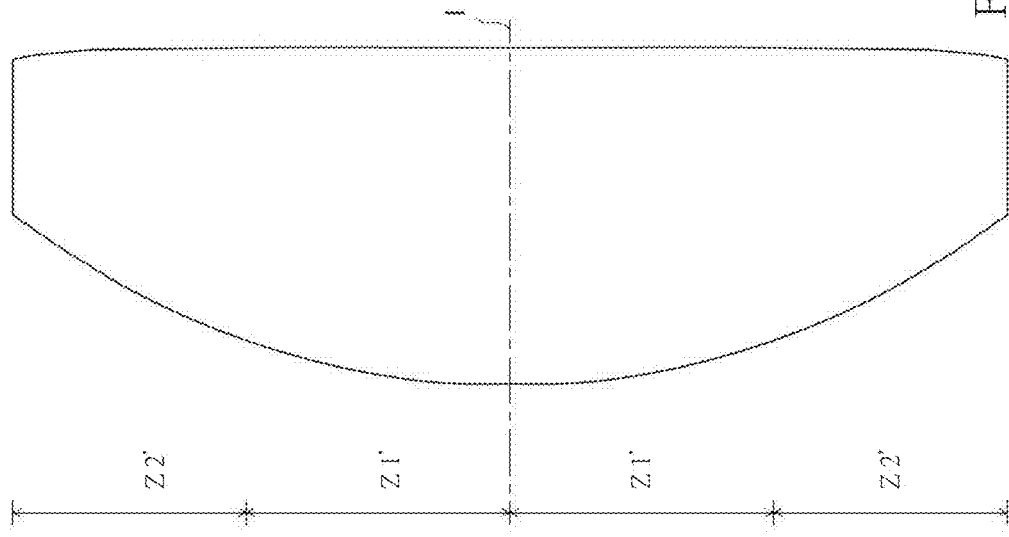
FIG. 5 depicts a schematic view of a third example of a surface shape and an effective radius of a lens element.

FIG. 5 illustrates a lens element having no transition point on the object-side surface of the lens element. In this case, the portion between 0-50% of the effective radius (radius of the clear aperture) Z1' may be determined as the portion in a vicinity of the optical axis, and the portion between 50-100% of the effective radius Z2' may be determined as the portion in a vicinity of a periphery of the lens element. The portion in a vicinity of the optical axis of the object-side surface of the lens element may be determined as having a convex shape due to its positive R value, and the portion in a vicinity of a periphery of the lens element may be determined as having a convex shape as well.

Figure 6:
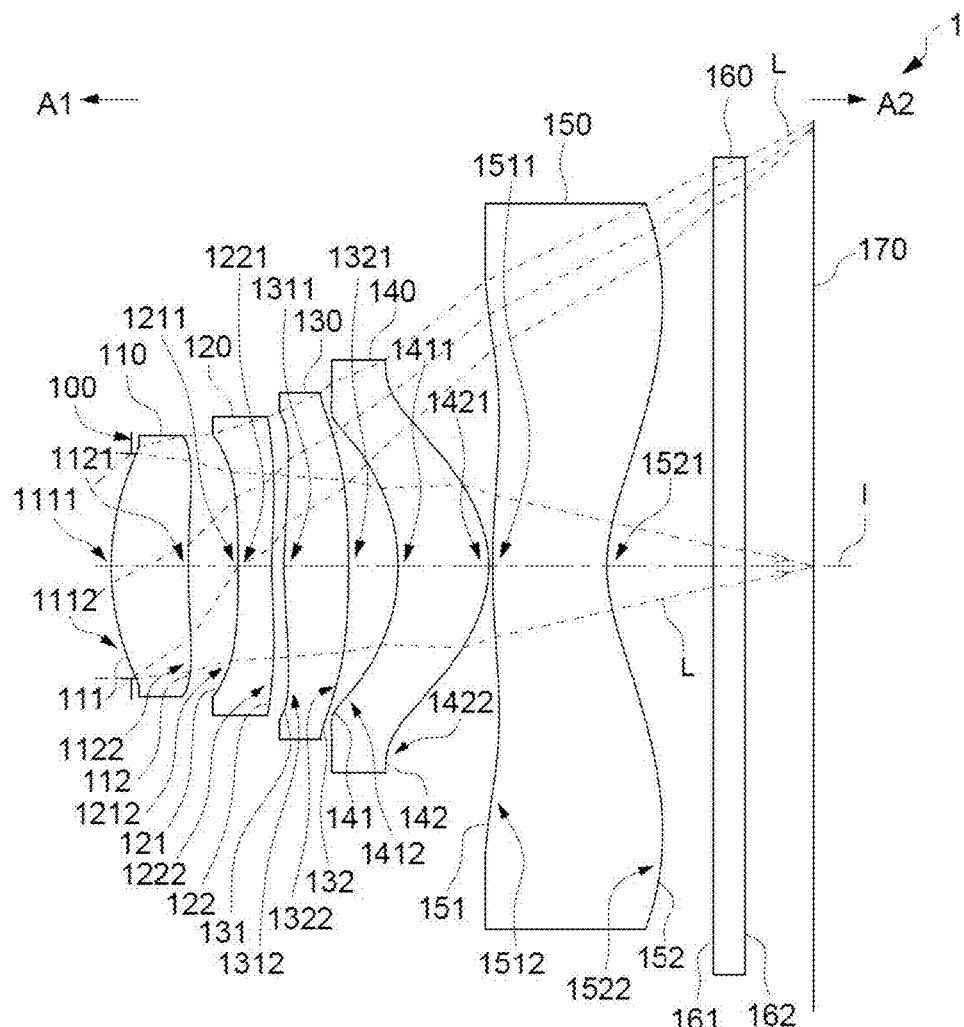
FIG. 6 depicts a cross-sectional view of a first embodiment of an optical imaging lens having five lens elements according to one embodiment of the present disclosure.
Figure 7:
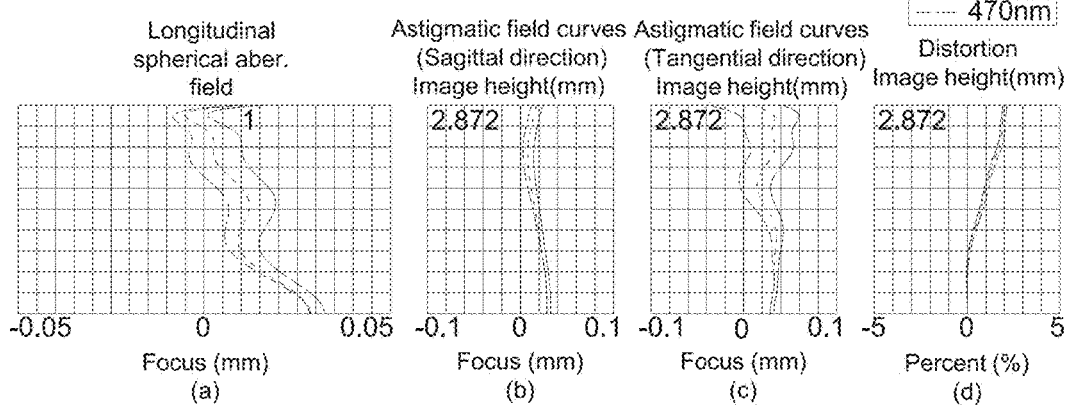
FIG. 7 depicts a chart of longitudinal spherical aberration and other kinds of optical aberrations of a first embodiment of an optical imaging lens according to the present disclosure.

Several exemplary embodiments and associated optical data will now be provided to illustrate non-limiting examples of optical imaging lens systems having good optical characteristics while increasing the field of view. Reference is now made to FIGS. 6-9. FIG. 6 illustrates an example cross-sectional view of an optical imaging lens 1 having five lens elements according to a first example embodiment. FIG. 7 shows example charts of longitudinal spherical aberration and other kinds of optical aberrations of the optical imaging lens 1 according to the first example embodiment. FIG. 8 illustrates an example table of optical data of each lens element of the optical imaging lens 1 according to the first example embodiment. FIG. 9 depicts an example table of aspherical data of the optical imaging lens 1 according to the first example embodiment.

As shown in FIG. 6, the optical imaging lens 1 of the present embodiment may comprise, in order from an object side A1 to an image side A2 along an optical axis, an aperture stop 100, a first lens element 110, a second lens element 120, a third lens element 130, a fourth lens element 140, and a fifth lens element 150. A filtering unit 160 and an image plane 170 of an image sensor (not shown) may be positioned at the image side A2 of the optical imaging lens 1. Each of the first, second, third, fourth, and fifth lens elements 110, 120, 130, 140, 150 and the filtering unit 160 may comprise an object-side surface 111/121/131/141/151/161 facing toward the object side A1 and an image-side surface 112/122/132/142/152/162 facing toward the image side A2. The example embodiment of the filtering unit 160 illustrated may be an IR cut filter (infrared cut filter) positioned between the fifth lens element 150 and an image plane 170. The filtering unit 160 may selectively absorb light passing optical imaging lens 1 that has a specific wavelength. For example, if IR light is absorbed, IR light which is not seen by human eyes may be prohibited from producing an image on the image plane 170.

Exemplary embodiments of each lens element of the optical imaging lens 1 will now be described with reference to the drawings. The lens elements of the optical imaging lens 1 may be constructed using plastic materials in this embodiment.

An example embodiment of the first lens element 110 may have positive refracting power. The object-side surface 111 may comprise a convex portion 1111 in a vicinity of an optical axis and a convex portion 1112 in a vicinity of a periphery of the first lens element 110. The image-side surface 112 may comprise a concave portion 1121 in a vicinity of the optical axis and a convex portion 1122 in a vicinity of the periphery of the first lens element 110.

An example embodiment of the second lens element 120 may have negative refracting power. The object-side surface 121 may comprise a concave portion 1211 in a vicinity of the optical axis and a concave portion 1212 in a vicinity of a periphery of the second lens element 120. The image-side surface 122 may comprise a concave portion 1221 in a vicinity of the optical axis and a convex portion 1222 in a vicinity of the periphery of the second lens element 120.

An example embodiment of the third lens element 130 may have positive refracting power. The object-side surface 131 may comprise a convex portion 1311 in a vicinity of the optical axis and a concave portion 1312 in a vicinity of a periphery of the third lens element 130. The image-side surface 132 may comprise a convex portion 1321 in a vicinity of the optical axis and a convex portion 1322 in a vicinity of the periphery of the third lens element 130.

An example embodiment of the fourth lens element 140 may have positive refracting power. The object-side surface 141 may comprise a concave portion 1411 in a vicinity of the optical axis and a convex portion 1412 in a vicinity of a periphery of the fourth lens element 140. The image-side surface 142 may comprise a convex portion 1421 in a vicinity of the optical axis and a convex portion 1422 in a vicinity of the periphery of the fourth lens element 140.

An example embodiment of the fifth lens element 150 may have negative refracting power. The object-side surface 151 may comprise a convex portion 1511 in a vicinity of the optical axis and a concave portion 1512 in a vicinity of a periphery of the fifth lens element 150. The image-side surface 152 may comprise a concave portion 1521 in a vicinity of the optical axis and a convex portion 1522 in a vicinity of the periphery of the fifth lens element 150.

The aspherical surfaces including the object-side surface 111 and the image-side surface 112 of the first lens element 110, the object-side surface 121 and the image-side surface 122 of the second lens element 120, the object-side surface 131 and the image-side surface 132 of the third lens element 130, the object-side surface 141 and the image-side surface 142 of the fourth lens element 140, and the object-side surface 151 and the image-side surface 152 of the fifth lens element 150 may all be defined by the following aspherical formula (1):

$$Z(Y) = \frac{Y^2}{R} \Bigg/ \left(1 + \sqrt{1-(1+K)\frac{Y^2}{R^2}}\right) + \sum_{i=1}^{n} a_i \times Y^i \quad \text{formula (1)}$$

wherein,

R represents the radius of curvature of the surface of the lens element;

Z represents the depth of the aspherical surface (i.e., the perpendicular distance between the point of the aspherical surface at a distance Y from the optical axis and the tangent plane of the vertex on the optical axis of the aspherical surface);

Y represents the perpendicular distance between the point of the aspherical surface and the optical axis;

K represents a conic constant; and $a_i$ represents an aspherical coefficient of $i^{th}$ level.

Values of each aspherical parameter are shown in FIG. 9.

FIG. 7(a) shows the longitudinal spherical aberration, wherein the horizontal axis of FIG. 7(a) defines the focus, and wherein the vertical axis of FIG. 7(a) defines the field of view. FIG. 7(b) shows the astigmatism aberration in the sagittal direction, wherein the horizontal axis of FIG. 7(b) defines the focus, and wherein the vertical axis of FIG. 7(b) defines the image height. FIG. 7(c) shows the astigmatism aberration in the tangential direction, wherein the horizontal axis of FIG. 7(c) defines the focus, and wherein the vertical axis of FIG. 7(c) defines the image height. FIG. 7(d) shows a variation of the distortion aberration, wherein the horizontal axis of FIG. 7(d) defines the percentage, and wherein the vertical axis of FIG. 7(d) defines the image height. The three curves with different wavelengths (470 nm, 555 nm, 650 nm) may represent that off-axis light with respect to these wavelengths may be focused around an image point. From the vertical deviation of each curve shown in FIG. 7(a), the offset of the off-axis light relative to the image point may be within about ±0.035 mm. Therefore, the first embodiment may improve the longitudinal spherical aberration with respect to different wavelengths. Referring to FIG. 7(b), the focus variation with respect to the three different wavelengths (470 nm, 555 nm, 650 nm) in the whole field may fall within about ±0.04 mm. Referring to FIG. 7(c), the focus variation with respect to the three different wavelengths (470 nm, 555 nm, 650 nm) in the whole field may fall within about ±0.06 mm. Referring to FIG. 7(d), the horizontal axis of FIG. 7(d), the variation of the distortion aberration may be within about ±2.5%.

The values of T1, G12, T2, G23, T3, G34, T4, G45, T5, G5F, TF, GFP, AAG, ALT, BFL, TTL, TL, EFL, TTL/BFL, TL/G12, TTL/T4, TL/BFL, EFL/T4, (T4+G45+T5)/T4, G12/T2, T5/G12, ALT/T5, TL/G34, AAG/T1, AAG/T3, AAG/G34, EFL/T1, (T2+G23+T3)/T1, (T2+G23+T3)/T3, (T2+G23+T3)/G34, (T4+G45+T5)/T1, ALT/T1 of this embodiment may be referred to FIG. 30. Additionally, these terms may be represented ranges of values defined by minimum and maximum values of each term. As such, values within the ranges of maximum and/or minimum values of each term may be contemplated and/or otherwise utilized herein.

The distance from the object-side surface 111 of the first lens element 110 to the image plane 170 along the optical axis (TTL) may be about 9.147 mm, Fno may be about 2.390, and HFOV may be about 14.90 degrees. When the value of Fno is smaller, the size of the aperture stop and the amounts of light entering into the optical imaging lens may be larger. In accordance with these values, the present embodiment may provide an optical imaging lens having a shortened length while maintaining more advantageous amounts of light entering into the optical imaging lens.

Figure 10:
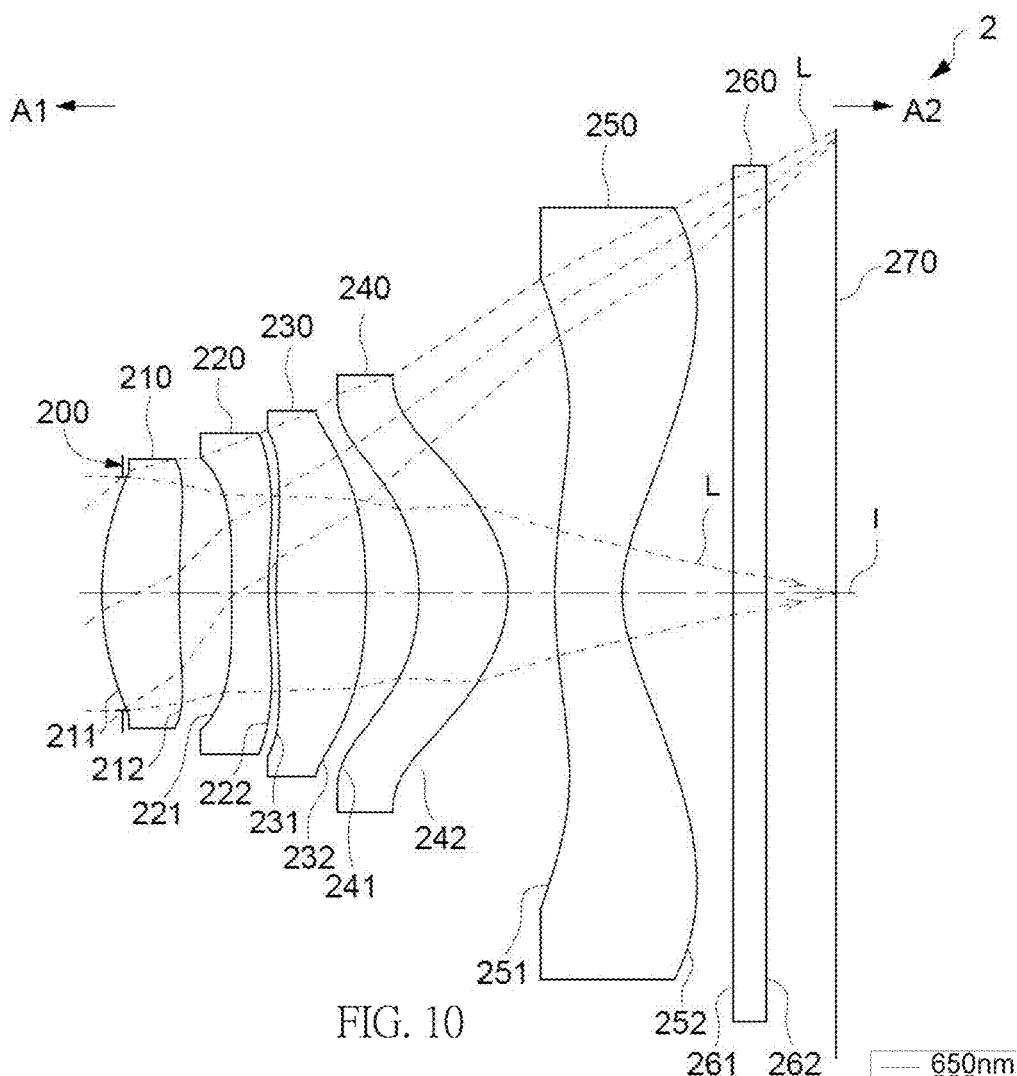
FIG. 10 depicts a cross-sectional view of a second embodiment of an optical imaging lens having five lens elements according to the present disclosure.
Figure 11:
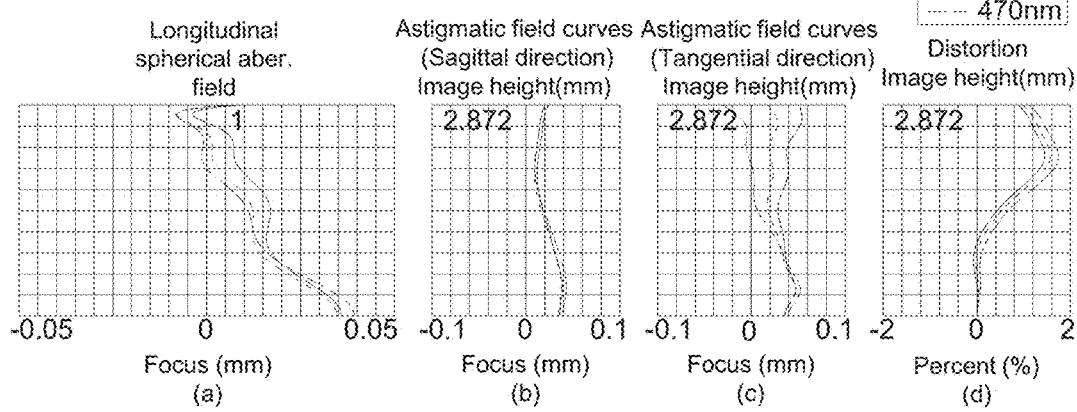
FIG. 11 depicts a chart of longitudinal spherical aberration and other kinds of optical aberrations of a second embodiment of an optical imaging lens according to one embodiment of the present disclosure.

Reference is now made to FIGS. 10-13. FIG. 10 illustrates an example cross-sectional view of an optical imaging lens 2 having five lens elements according to a second example embodiment. FIG. 11 shows example charts of longitudinal spherical aberration and other kinds of optical aberrations of the optical imaging lens 2 according to the second example embodiment. FIG. 12 shows an example table of optical data of each lens element of the optical imaging lens 2 according to the second example embodiment. FIG. 13 shows an example table of aspherical data of the optical imaging lens 2 according to the second example embodiment. The reference numbers labeled in the present embodiment may be similar to those in the first embodiment for the similar elements, but here the reference numbers may be initialed with 2; for example, reference number 231 may label the object-side surface of the third lens element 230, reference number 232 may label the image-side surface of the third lens element 230, etc.

As shown in FIG. 10, the optical imaging lens 2 of the present embodiment, in an order from an object side A1 to an image side A2 along an optical axis, may comprise an aperture stop 200, a first lens element 210, a second lens element 220, a third lens element 230, a fourth lens element 240, and a fifth lens element 250.

The arrangements of convex or concave surface structures including the object-side surfaces 211, 221, 231, 241, 251 and the image-side surfaces 212, 222, 232, 242, 252 may be generally similar to the optical imaging lens 1. Additional differences may include a radius of curvature, a thickness, an aspherical data, and an effective focal length of each lens element.

Here, in the interest of clearly showing the drawings of a particular embodiment, only the surface shapes which are different from that in the first embodiment may be labeled. Please refer to FIG. 12 for the optical characteristics of each lens element in the optical imaging lens 2 of the present embodiment.

From the vertical deviation of each curve shown in FIG. 11(*a*), the offset of the off-axis light relative to the image point may be within about ±0.04 mm. Referring to FIG. 11(*b*), the focus variation with respect to the three different wavelengths (470 nm, 555 nm, 650 nm) in the whole field may fall within about ±0.05 mm. Referring to FIG. 11(*c*), the focus variation with respect to the three different wavelengths (470 nm, 555 nm, 650 nm) in the whole field may fall within about ±0.06 mm. Referring to FIG. 11(*d*), the variation of the distortion aberration of the optical imaging lens 2 may be within about ±2%.

The values of T1, G12, T2, G23, T3, G34, T4, G45, T5, G5F, TF, GFP, AAG, ALT, BFL, TTL, TL, EFL, TTL/BFL, TL/G12, TTL/T4, TL/BFL, EFL/T4, (T4+G45+T5)/T4, G12/T2, T5/G12, ALT/T5, TL/G34, AAG/T1, AAG/T3, AAG/G34, EFL/T1, (T2+G23+T3)/T1, (T2+G23+T3)/T3, (T2+G23+T3)/G34, (T4+G45+T5)/T1, ALT/T1 of this embodiment may be referred to FIG. 30. Additionally, these terms may be represented ranges of values defined by minimum and maximum values of each term. As such, values within the ranges of maximum and/or minimum values of each term may be contemplated and/or otherwise utilized herein.

In comparison with the first embodiment, Fno is smaller, HFOV is larger, and imaging quality is better, and the optical imaging lens may be manufactured more easily so that the yield rate may be higher.

Figure 14:
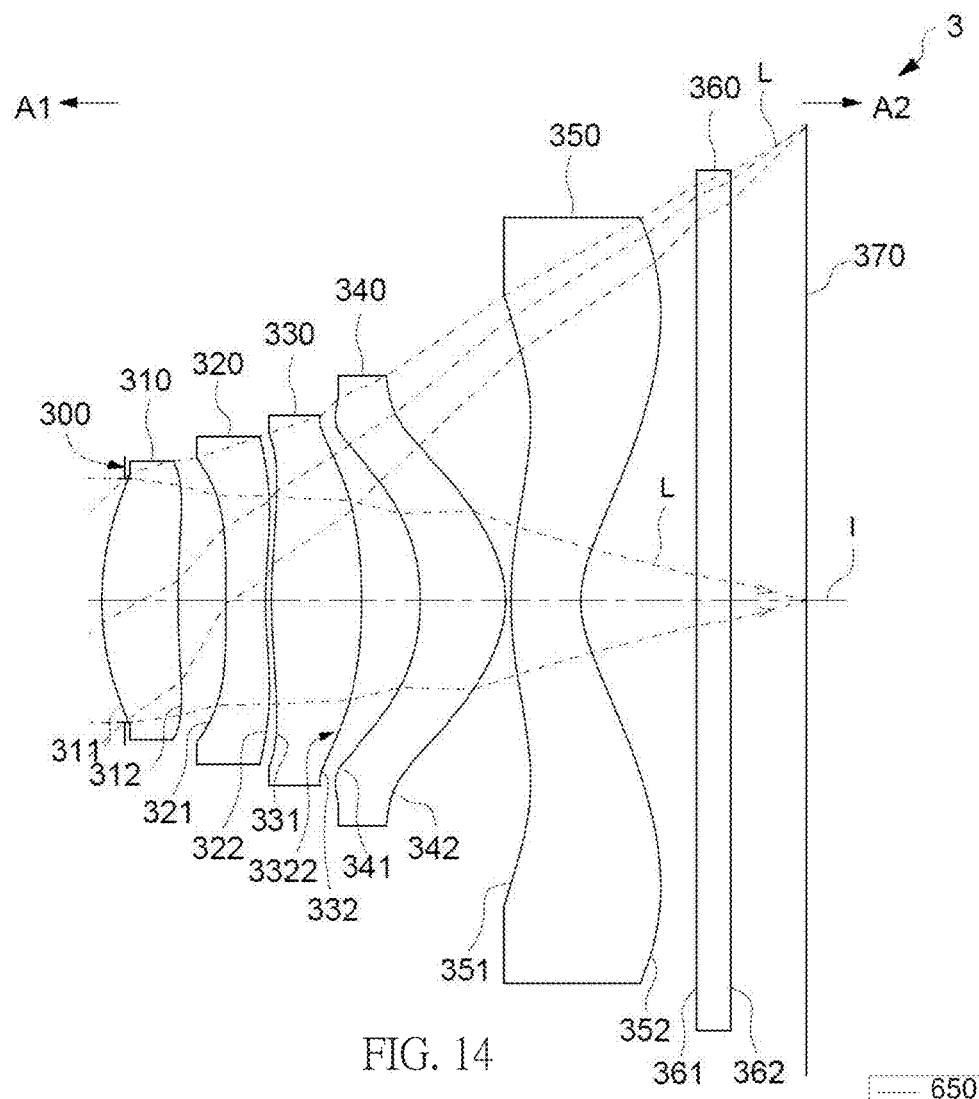
FIG. 14 depicts a cross-sectional view of a third embodiment of an optical imaging lens having five lens elements according to the present disclosure.
Figure 15:
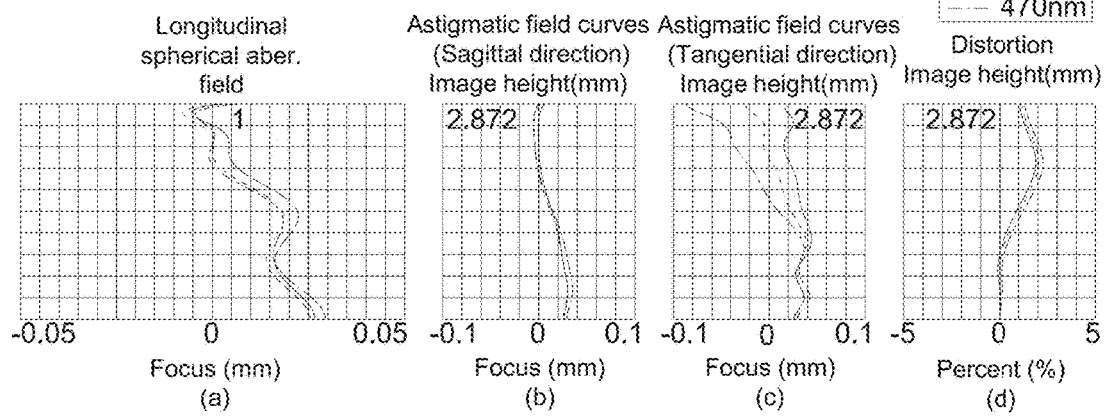
FIG. 15 depicts a chart of longitudinal spherical aberration and other kinds of optical aberrations of a third embodiment of an optical imaging lens according the present disclosure.

Reference is now made to FIGS. 14-17. FIG. 14 illustrates an example cross-sectional view of an optical imaging lens 3 having five lens elements according to a third example embodiment. FIG. 15 shows example charts of longitudinal spherical aberration and other kinds of optical aberrations of the optical imaging lens 3 according to the third example embodiment. FIG. 16 shows an example table of optical data of each lens element of the optical imaging lens 3 according to the third example embodiment. FIG. 17 shows an example table of aspherical data of the optical imaging lens 3 according to the third example embodiment. The reference numbers labeled in the present embodiment may be similar to those in the first embodiment for the similar elements, but here the reference numbers may be initialed with 3; for example, reference number 331 may label the object-side surface of the third lens element 330, reference number 332 may label the image-side surface of the third lens element 330, etc.

As shown in FIG. 14, the optical imaging lens 3 of the third example embodiment, in an order from an object side A1 to an image side A2 along an optical axis, may comprise an aperture stop 300, a first lens element 310, a second lens element 320, a third lens element 330, a fourth lens element 340, and a fifth lens element 350.

The arrangements of the convex or concave surface structures in the third example embodiment, including the object-side surfaces 311, 321, 331, 341, 351 and the image-side surfaces 312, 322, 342, 352 may be generally similar to the optical imaging lens 1 (FIG. 6 depicting the first example embodiment), but the differences between the optical imaging lens 1 and the optical imaging lens 3 may include the convex or concave surface structure of the image-side surface 332. Additional differences may include a radius of curvature, a thickness, aspherical data, and an effective focal length of each lens element. More specifically, the image-side surface 332 of the third lens element 330 may comprise a concave portion 3322 in a vicinity of a periphery of the third lens element 330.

Here, in the interest of clearly showing the drawings of a particular embodiment, only the surface shapes which are different from that in the first embodiment may be labeled. Please refer to FIG. 16 for the optical characteristics of each lens element in the optical imaging lens 3 of the third example embodiment.

From the vertical deviation of each curve shown in FIG. 15(*a*), the offset of the off-axis light relative to the image point may be within about ±0.03 mm. Referring to FIG. 15(*b*), the focus variation with respect to the three different wavelengths (470 nm, 555 nm, 650 nm) in the whole field may fall within about ±0.03 mm. Referring to FIG. 15(*c*), the focus variation with respect to the three different wavelengths (470 nm, 555 nm, 650 nm) in the whole field may fall within about ±0.1 mm. Referring to FIG. 15(*d*), the variation of the distortion aberration of the optical imaging lens 3 may be within about ±2.5%.

The values of T1, G12, T2, G23, T3, G34, T4, G45, T5, G5F, TF, GFP, AAG, ALT, BFL, TTL, TL, EFL, TTL/BFL, TL/G12, TTL/T4, TL/BFL, EFL/T4, (T4+G45+T5)/T4, G12/T2, T5/G12, ALT/T5, TL/G34, AAG/T1, AAG/T3, AAG/G34, EFL/T1, (T2+G23+T3)/T1, (T2+G23+T3)/T3, (T2+G23+T3)/G34, (T4+G45+T5)/T1, ALT/T1 of this embodiment may be referred to in FIG. 30. Additionally, these terms may be represented ranges of values defined by minimum and maximum values of each term. As such, values within the ranges of maximum and/or minimum values of each term may be contemplated and/or otherwise utilized herein.

In comparison with the first example embodiment, the third example embodiment may have smaller TTL and Fno values, larger HFOV values, improved imaging quality, and the optical imaging lens may be manufactured more easily so that the yield rate is higher.

Figure 18:
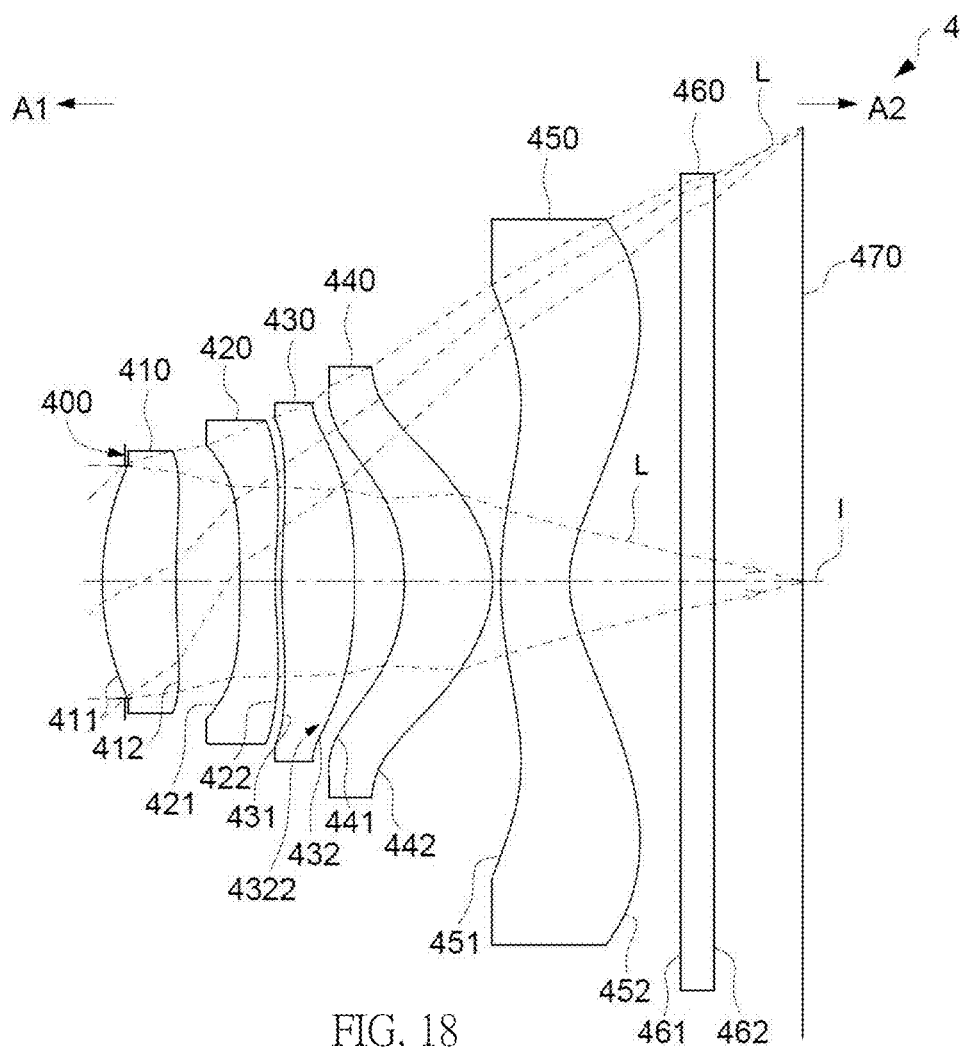
FIG. 18 depicts a cross-sectional view of a fourth embodiment of an optical imaging lens having five lens elements according to the present disclosure.
Figure 19:
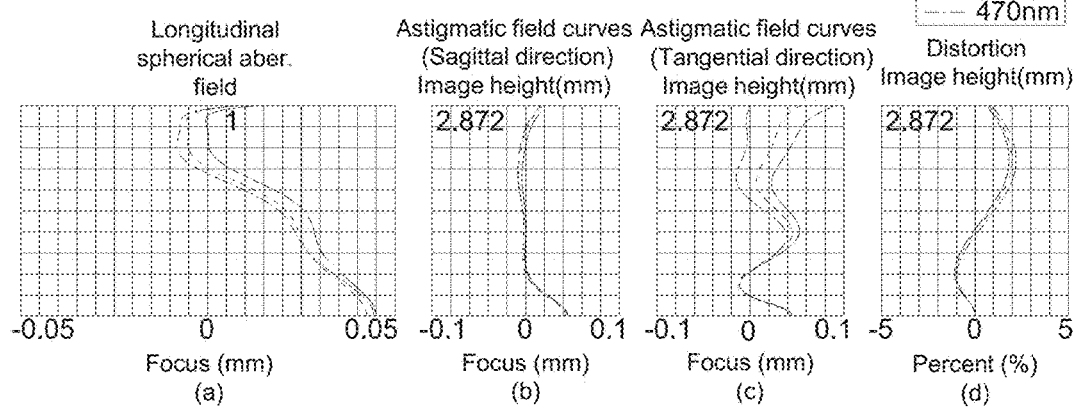
FIG. 19 depicts a chart of longitudinal spherical aberration and other kinds of optical aberrations of a fourth embodiment of an optical imaging lens according the present disclosure.

Reference is now made to FIGS. 18-21. FIG. 18 illustrates an example cross-sectional view of an optical imaging lens 4 having five lens elements according to a fourth example embodiment. FIG. 19 shows example charts of longitudinal spherical aberration and other kinds of optical aberrations of the optical imaging lens 4 according to the fourth embodiment. FIG. 20 shows an example table of optical data of each lens element of the optical imaging lens 4 according to the fourth example embodiment. FIG. 21 shows an example table of aspherical data of the optical imaging lens 4 according to the fourth example embodiment. The reference numbers labeled in the present embodiment may be similar to those in the first example embodiment for the similar elements, but here the reference numbers may be initialed with 4; for example, reference number 431 may label the object-side surface of the third lens element 430, reference number 432 may label the image-side surface of the third lens element 430, etc.

As shown in FIG. 18, the optical imaging lens 4 of the present embodiment, in an order from an object side A1 to an image side A2 along an optical axis, may comprise an aperture stop 400, a first lens element 410, a second lens element 420, a third lens element 430, a fourth lens element 440, and a fifth lens element 450.

The arrangements of the convex or concave surface structures, including the object-side surfaces 411, 421, 431, 441, 451 and the image-side surfaces 412, 422, 442, 452 may be generally similar to the optical imaging lens 1, but the differences between the optical imaging lens 1 and the optical imaging lens 4 may include the convex or concave surface of the image-side surface 432. Additional differences may include a radius of curvature, a thickness, aspherical data, and an effective focal length of each lens element. More specifically, the image-side surface 432 of the third lens element 430 may comprise a concave portion 4322 in a vicinity of a periphery of the third lens element 430.

Here, in the interest of clearly showing the drawings of a particular embodiment, only the surface shapes which are different from that in the first embodiment may be labeled. Please refer to FIG. 20 for the optical characteristics of each lens elements in the optical imaging lens 4 of the present embodiment.

From the vertical deviation of each curve shown in FIG. 19(a), the offset of the off-axis light relative to the image point may be within about ±0.45 mm. Referring to FIG. 19(b), the focus variation with respect to the three different wavelengths (470 nm, 555 nm, 650 nm) in the whole field may fall within about ±0.05 mm. Referring to FIG. 19(c), the focus variation with respect to the three different wavelengths (470 nm, 555 nm, 650 nm) in the whole field may fall within about ±0.1 mm. Referring to FIG. 19(d), the variation of the distortion aberration of the optical imaging lens 4 may be within about ±2.5%.

The values of T1, G12, T2, G23, T3, G34, T4, G45, T5, G5F, TF, GFP, AAG, ALT, BFL, TTL, TL, EFL, TTL/BFL, TL/G12, TTL/T4, TL/BFL, EFL/T4, (T4+G45+T5)/T4, G12/T2, T5/G12, ALT/T5, TL/G34, AAG/T1, AAG/T3, AAG/G34, EFL/T1, (T2+G23+T3)/T1, (T2+G23+T3)/T3, (T2+G23+T3)/G34, (T4+G45+T5)/T1, ALT/T1 of this embodiment may be referred to in FIG. 30. Additionally, these terms may be represented ranges of values defined by minimum and maximum values of each term. As such, values within the ranges of maximum and/or minimum values of each term may be contemplated and/or otherwise utilized herein.

In comparison with the first example embodiment, the fourth example embodiment may have smaller TTL and Fno, larger HFOV, and the optical imaging lens may be manufactured more easily so that the yield rate is higher.

Figure 22:
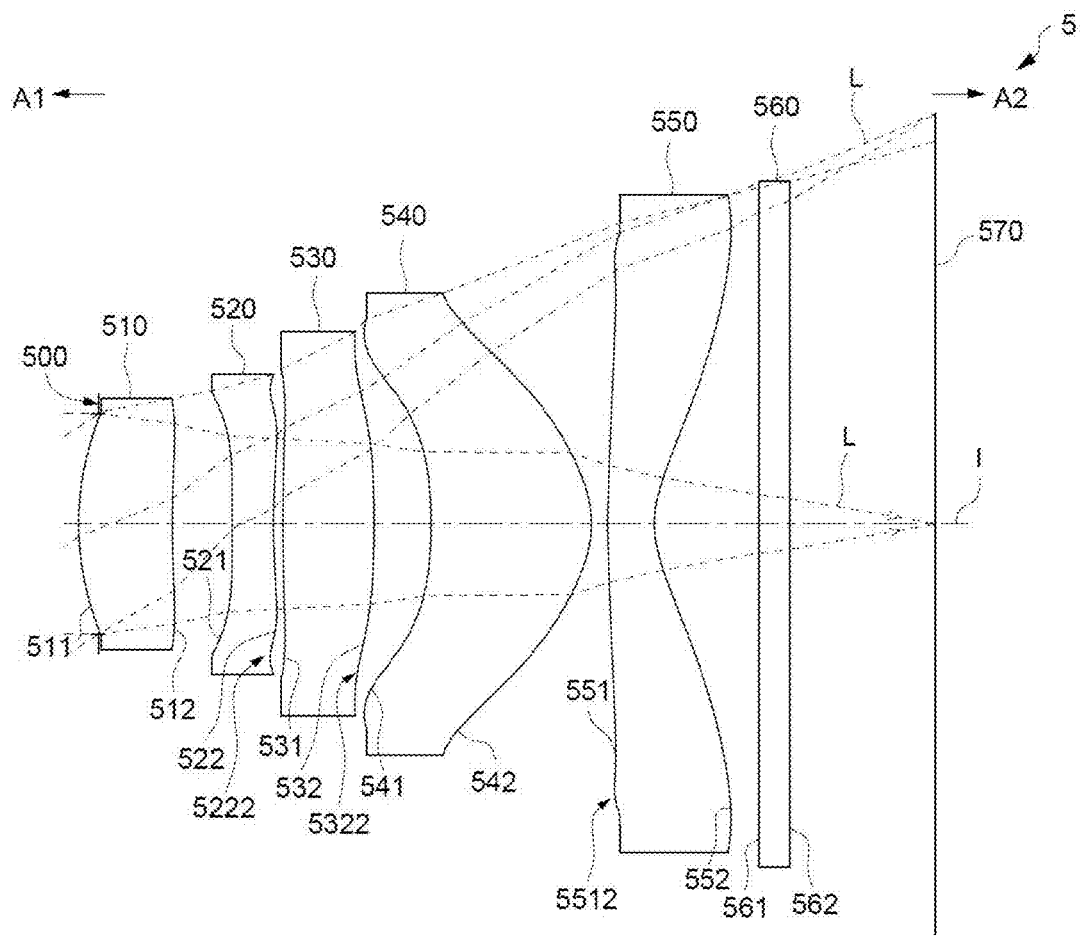
FIG. 22 depicts a cross-sectional view of a fifth embodiment of an optical imaging lens having five lens elements according to the present disclosure.
Figure 23:
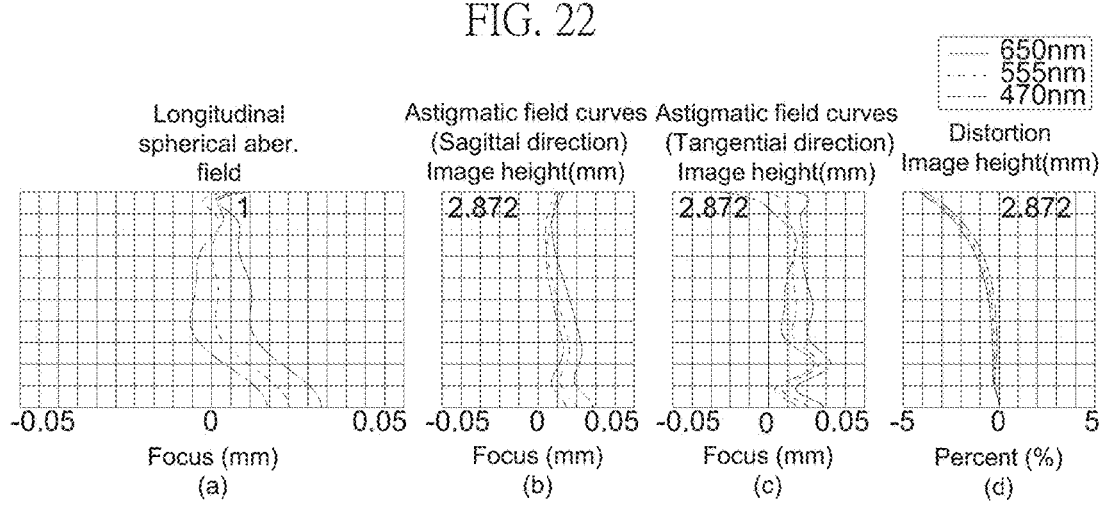
FIG. 23 depicts a chart of longitudinal spherical aberration and other kinds of optical aberrations of a fifth embodiment of the optical imaging lens according the present disclosure.

Reference is now made to FIGS. 22-25. FIG. 22 illustrates an example cross-sectional view of an optical imaging lens 5 having five lens elements according to a fifth example embodiment. FIG. 23 shows example charts of longitudinal spherical aberration and other kinds of optical aberrations of the optical imaging lens 5 according to the fifth embodiment. FIG. 24 shows an example table of optical data of each lens element of the optical imaging lens 5 according to the fifth example embodiment. FIG. 25 shows an example table of aspherical data of the optical imaging lens 5 according to the fifth example embodiment. The reference numbers labeled in the present embodiment may be similar to those in the first embodiment for the similar elements, but here the reference numbers may be initialed with 5; for example, reference number 531 may label the object-side surface of the third lens element 530, reference number 532 may label the image-side surface of the third lens element 530, etc.

As shown in FIG. 22, the optical imaging lens 5 of the present embodiment, in an order from an object side A1 to an image side A2 along an optical axis, may comprise an aperture stop 500, a first lens element 510, a second lens element 520, a third lens element 530, a fourth lens element 540, and a fifth lens element 550.

The arrangements of the convex or concave surface structures, including the object-side surfaces 511, 521, 531, 541 and the image-side surfaces 512, 542, 552 may be generally similar to the optical imaging lens 1, but the differences between the optical imaging lens 1 (FIG. 6 depicting the first example embodiment) and the optical imaging lens 5 (FIG. 22 depicting the fifth example embodiment) may include the convex or concave surface structure of the object-side surface 551 and image-side surfaces 522 and 532. Additional differences may include a radius of curvature, a thickness, aspherical data, and an effective focal length of each lens element. More specifically, the object-side surface 551 of the fifth lens element 550 may include a convex portion 5512 in a vicinity of a periphery of the fifth lens element 550, the image-side surface 522 of the second lens element 520 may include a concave portion 5222 in a vicinity of a periphery of the second lens element 520, and the image-side surface 532 of the third lens element 530 may include a concave portion 5322 in a vicinity of a periphery of the third lens element 530.

Here, in the interest of clearly showing the drawings of a particular embodiment, only the surface shapes which are different from that in the first embodiment may be labeled. FIG. 24 depicts the optical characteristics of each lens elements in the optical imaging lens 5 of the present embodiment.

From the vertical deviation of each curve shown in FIG. 23(a), the offset of the off-axis light relative to the image point may be within about ±0.03 mm. Referring to FIG. 23(b), the focus variation with respect to the three different wavelengths (470 nm, 555 nm, 650 nm) in the whole field may fall within about ±0.03 mm. Referring to FIG. 23(c), the focus variation with respect to the three different wavelengths (470 nm, 555 nm, 650 nm) in the whole field may fall within about ±0.035 mm. Referring to FIG. 23(d), the variation of the distortion aberration of the optical imaging lens 5 may be within about ±5%.

The values of T1, G12, T2, G23, T3, G34, T4, G45, T5, G5F, TF, GFP, AAG, ALT, BFL, TTL, TL, EFL, TTL/BFL, TL/G12, TTL/T4, TL/BFL, EFL/T4, (T4+G45+T5)/T4, G12/T2, T5/G12, ALT/T5, TL/G34, AAG/T1, AAG/T3, AAG/G34, EFL/T1, (T2+G23+T3)/T1, (T2+G23+T3)/T3, (T2+G23+T3)/G34, (T4+G45+T5)/T1, ALT/T1 of this embodiment may be referred to in FIG. 30. Additionally, these terms may be represented ranges of values defined by minimum and maximum values of each term. As such, values within the ranges of maximum and/or minimum values of each term may be contemplated and/or otherwise utilized herein.

In comparison with the first embodiment, the imaging quality is better and the optical imaging lens can be manufactured more easily and the yield rate is higher.

Figure 26:
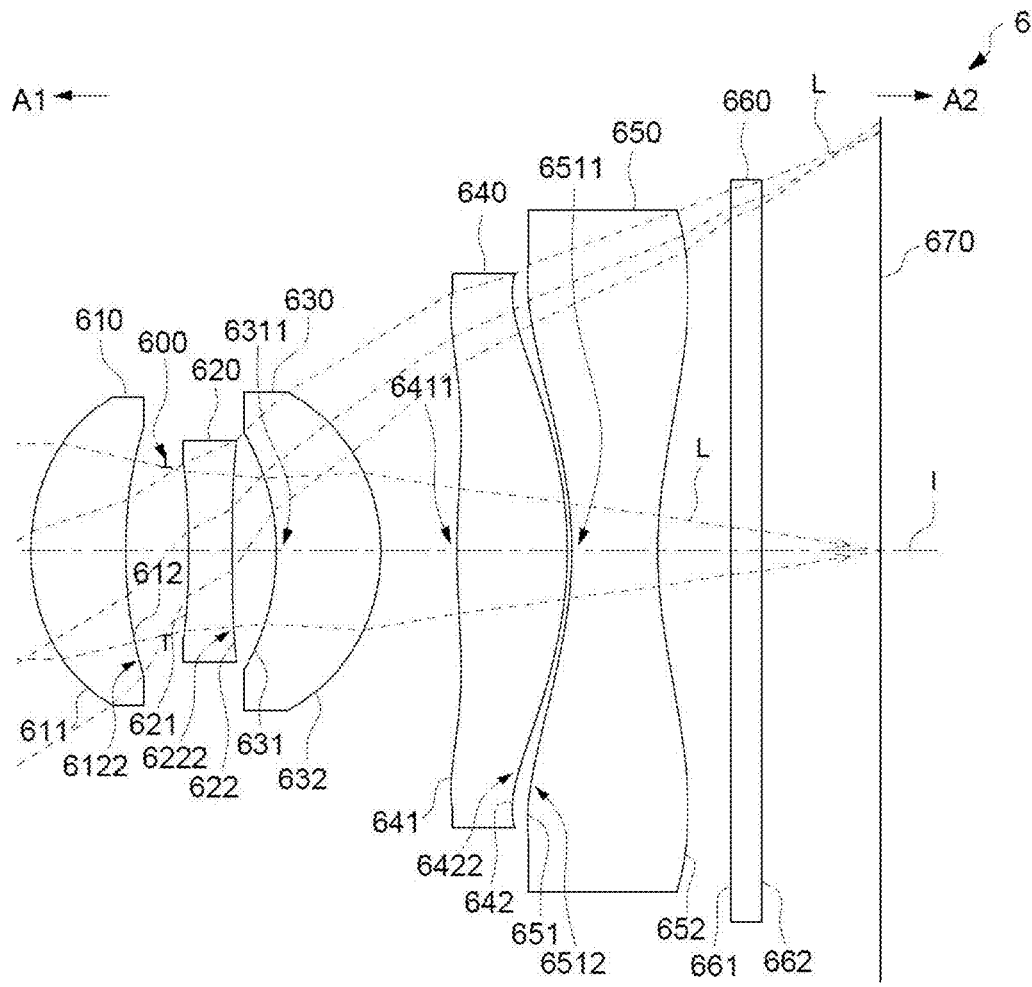
FIG. 26 depicts a cross-sectional view of a sixth embodiment of an optical imaging lens having five lens elements according to the present disclosure.
Figure 27:
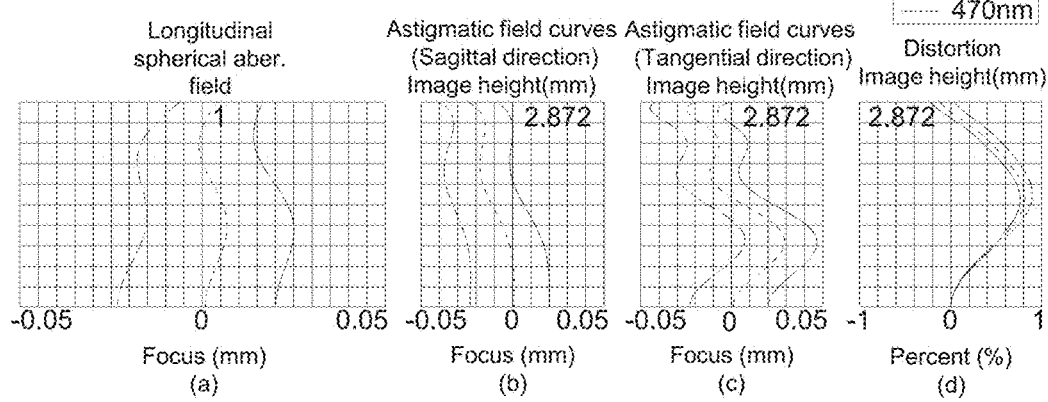
FIG. 27 depicts a chart of longitudinal spherical aberration and other kinds of optical aberrations of a sixth embodiment of the optical imaging lens according to the present disclosure.

Reference is now made to FIGS. 26-29. FIG. 26 illustrates an example cross-sectional view of an optical imaging lens 6 having five lens elements according to a sixth example embodiment. FIG. 27 shows example charts of longitudinal spherical aberration and other kinds of optical aberrations of the optical imaging lens 6 according to the sixth embodiment. FIG. 28 shows an example table of optical data of each lens element of the optical imaging lens 6 according to the sixth example embodiment. FIG. 29 shows an example table of aspherical data of the optical imaging lens 6 according to the sixth example embodiment. The reference numbers labeled in the present embodiment are similar to those in the first embodiment for the similar elements, but here the reference numbers are initialed with 6; for example, reference number 631 may label the object-side surface of the third lens element 630, reference number 632 may label the image-side surface of the third lens element 630, etc.

As shown in FIG. 26, the optical imaging lens 6 of the present embodiment, in an order from an object side A1 to an image side A2 along an optical axis, may comprise a first lens element 610, an aperture stop 600, a second lens element 620, a third lens element 630, a fourth lens element 640, and a fifth lens element 650.

The arrangements of the convex or concave surface structures, including the object-side surfaces 611, 621 and the image-side surfaces 632, 652 may be generally similar to the optical imaging lens 1 (FIG. 6 depicting the first example embodiment), but the differences between the optical imaging lens 1 and the optical imaging lens 6 may include the convex or concave surface structures of the object-side surfaces 631, 641 and 651 and the image-side surfaces 612, 622 and 642 and the position of the aperture stop 600. Additional differences may include a radius of curvature, a thickness, aspherical data, and an effective focal length of each lens element. More specifically, the aperture stop 600 is disposed between the first lens element 610 and the second lens element 620, the object-side surface 631 of the third lens element 630 may comprise a concave portion 6311 in a vicinity of the optical axis, the object-side surface 641 of the fourth lens element 640 may include a convex portion 6411 in a vicinity of the optical axis, the object-side surface 651 of the fifth lens element 650 may include a concave portion 6511 in a vicinity of the optical axis and a convex portion 6512 in a vicinity of a periphery of the fifth lens element 650, the image-side surface 612 of the first lens element 610 may include a concave portion 6122 in a vicinity of a periphery of the first lens element 610, the image-side surface 622 of the second lens element 620 may include a concave portion 6222 in a vicinity of a periphery of the second lens element 620, and the image-side surface 642 of the fourth lens element 640 may include a concave portion 6422 in a vicinity of a periphery of the fourth lens element 640.

Here, in the interest of clearly showing the drawings of a particular embodiment, only the surface shapes which are different from that in the first embodiment may be labeled. Please refer to FIG. 28 for the optical characteristics of each lens elements in the optical imaging lens 6 of the present embodiment.

From the vertical deviation of each curve shown in FIG. 27(a), the offset of the off-axis light relative to the image point may be within about ±0.025 mm. Referring to FIG. 27(b), the focus variation with respect to the three different wavelengths (470 nm, 555 nm, 650 nm) in the whole field may fall within about ±0.04 mm. Referring to FIG. 23(c), the focus variation with respect to the three different wavelengths (470 nm, 555 nm, 650 nm) in the whole field may fall within about ±0.05 mm. Referring to FIG. 27(d), the variation of the distortion aberration of the optical imaging lens 6 may be within about ±1%.

The values of T1, G12, T2, G23, T3, G34, T4, G45, T5, G5F, TF, GFP, AAG, ALT, BFL, TTL, TL, EFL, TTL/BFL, TL/G12, TTL/T4, TL/BFL, EFL/T4, (T4+G45+T5)/T4, G12/T2, T5/G12, ALT/T5, TL/G34, AAG/T1, AAG/T3, AAG/G34, EFL/T1, (T2+G23+T3)/T1, (T2+G23+T3)/T3, (T2+G23+T3)/G34, (T4+G45+T5)/T1, ALT/T1 of this embodiment may be referred to in FIG. 30. Additionally, these terms may be represented ranges of values defined by minimum and maximum values of each term. As such, values within the ranges of maximum and/or minimum values of each term may be contemplated and/or otherwise utilized herein.

In comparison with the first example embodiment (e.g., FIG. 6), the sixth example embodiment may have improved imaging quality, the optical imaging lens may be manufactured more easily, and the yield rate may be higher.

The values of T1, G12, T2, G23, T3, G34, T4, G45, T5, G5F, TF, GFP, AAG, ALT, BFL, TTL, TL, EFL, TTL/BFL, TL/G12, TTL/T4, TL/BFL, EFL/T4, (T4+G45+T5)/T4, G12/T2, T5/G12, ALT/T5, TL/G34, AAG/T1, AAG/T3, AAG/G34, EFL/T1, (T2+G23+T3)/T1, (T2+G23+T3)/T3, (T2+G23+T3)/G34, (T4+G45+T5)/T1, ALT/T1 of all embodiment may be referred to in FIG. 30, and it is clear that the optical imaging lens of any one of the ten embodiments may satisfy the Inequalities (1) to (19). Additionally, these terms may be represented ranges of values defined by minimum and maximum values of each term. As such, values within the ranges of maximum and/or minimum values of each term may be contemplated and/or otherwise utilized herein.

The range of values including the maximum and minimum values obtained by the combination ratio relationship of the optical parameters disclosed in the various embodiments of the present disclosure can be practiced.

The arrangements of the image-side surface of the first lens element having a concave portion in a vicinity of the optical axis, the image-side surface of the second lens element having a concave portion in a vicinity of the optical axis, and the image-side surface of the fifth lens element having a concave portion in a vicinity of the optical axis may assist in converging light. The arrangement of the object-side surface of the fourth lens element having a convex portion in a vicinity of a periphery of the fourth lens element may assist in converging light. When light enters the fourth and the fifth lens elements with a large incident angle, it may deviate from the efficient radius of the fourth or fifth lens element such that the light can't reach the imaging plane. The arrangement of the object-side surface of the fourth lens element having a convex portion in a vicinity of a periphery of the fourth lens element may improve this drawback. The arrangements of the object-side surface of the second lens element having a concave portion in a vicinity of the optical axis, the image-side surface of the third lens element having a convex portion in a vicinity of the optical axis, and the image-side surface of the fifth lens element having a convex portion in a vicinity of the periphery of the fifth lens element may correct the total aberration. The second lens element having negative refracting power may eliminate the aberration caused by the first lens element. The third and the fourth lens elements having positive refracting powers may assist on correcting aberrations. Via the above arrangements, the length of the optical imaging lens may be shortened efficiently and the imaging quality may be maintained.

For shortening the length of the optical imaging lens, the gap between two adjacent lens elements and the thickness of each lens element may be appropriately decreased. Furthermore, if the assembly difficulty and the imaging quality are also considered simultaneously, the thickness and the gaps may satisfy any one of inequalities as follows:

$(T4+G45+T5)/T4 \leq 2.300$, and a more advantageous range is "$1.200 \leq (T4+G45+T5)/T4 \leq 2.300$"

$G12/T2 \leq 1.800$, and a more advantageous range is "$0.600 \leq G12/T2 \leq 1.800$"

$T5/G1 \leq 2.300$, and a more advantageous range is "$0.200 \leq T5/G12 \leq 2.300$"

$ALT/T5 \leq 10.000$, and a more advantageous range is "$3.300 \leq ALT/T5 \leq 10.000$"

$AAG/T1 \leq 2.600$, and a more advantageous range is "$1.400 \leq AAG/T1 \leq 2.600$"

$AAG/T3 \leq 1.800$, and a more advantageous range is "$1.200 \leq AAG/T3 \leq 1.800$"

$AAG/G34 \leq 3.300$, and a more advantageous range is "$1.800 \leq AAG/G34 \leq 3.300$"

$(T2+G23+T3)/T1 \leq 2.100$, and a more advantageous range is "$1.300 \leq (T2+G23+T3)/T1 \leq 2.100$"

$(T2+G23+T3)/T3 \leq 1.900$, and a more advantageous range is "$1.500 \leq (T2+G23+T3)/T3 \leq 1.900$"

$(T2+G23+T3)/G34 \leq 2.500$, and a more advantageous range is "$2.000 \leq (T2+G23+T3)/G34 \leq 2.500$";

$(T4+G45+T5)/T1 \leq 2.700$, and a more advantageous range is "$1.800 \leq (T4+G45+T5)/T1 \leq 2.700$"; and $ALT/T1 \leq 5.200$, and a more advantageous range is "$4.200 \leq ALT/T1 \leq 5.200$".

The difficulty for manufacturing the optical imaging lens may be increased when the optical parameters of the optical imaging lens are too small. The length of the optical imaging lens may be increased when optical parameters of the optical imaging lens are too large. In order to overcome these drawbacks, some optical parameters of the optical imaging lens may satisfy any one of inequalities as follows:

$TTL/BFL \leq 3.900$, and a more advantageous range is "$2.800 \leq TTL/BFL \leq 3.900$";

$TL/G12 \leq 10.000$, and a more advantageous range is "$4.300 \leq TL/G12 \leq 10.000$"

$TTL/T4 \leq 8.300$, and a more advantageous range is "$5.000 \leq TTL/T4 \leq 8.300$"

$TL/BFL \leq 6.400$, and a more advantageous range is "$2.000 TL/BFL \leq 6.400$"

$TL/G34 \leq 10.000$, and a more advantageous range is "$8.100 \leq TL/G34 \leq 10.000$".

Decreasing the value of EFL is advantageous for increasing HFOV. Therefore, HFOV can be increased when some optical parameters of the optical imaging lens may satisfy any one of inequalities as follows:

$EFL/T4 \leq 5.900$, and a more advantageous range is "$0.400 \leq EFL/T4 \leq 5.900$"; and $EFL/T1 \leq 6.800$, and a more advantageous range is "$0.800 \leq EFL/T1 \leq 6.800$".

According to the present disclosure, the longitudinal spherical aberration, the astigmatism aberration, and the variation of the distortion aberration of each embodiment may meet the use requirements of various electronic products which implement an optical imaging lens. Moreover, the off-axis light with respect to 470 nm, 555 nm and 650 nm wavelengths may be focused around an image point, and the offset of the off-axis light for each curve relative to the image point may be controlled to effectively inhibit the longitudinal spherical aberration, the astigmatism aberration, and the variation of the distortion aberration. Further, as shown by the imaging quality data provided for each embodiment, the distance between the 470 nm, 555 nm and 650 nm wavelengths may indicate that focusing ability and inhibiting ability for dispersion is provided for different wavelengths.

While various embodiments in accordance with the disclosed principles been described above, it should be understood that they are presented by way of example only, and are not limiting. Thus, the breadth and scope of exemplary embodiment(s) should not be limited by any of the above-described embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. § 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. An optical imaging lens comprising sequentially from an object side to an image side along an optical axis: a first lens element, a second lens element, a third lens element, a fourth lens element, and a fifth lens element, each of the first, second, third, fourth, and fifth lens elements having an object-side surface facing toward the object side and an image-side surface facing toward the image side, wherein:
the image-side surface of the first lens element comprises a concave portion in a vicinity of the optical axis;
the second lens element has negative refracting power, and the object-side surface of the second lens element comprises a concave portion in a vicinity of the optical axis;
the third lens element has positive refracting power, the object-side surface of the third lens element comprises a concave portion in a vicinity of a periphery of the third lens element, and the image-side surface of the third lens element comprises a convex portion in a vicinity of the optical axis;
the fourth lens element has positive refracting power and the object-side surface of the fourth lens element comprises a convex portion in a vicinity of a periphery of the fourth lens element;
the image-side surface of the fifth lens element comprises a concave portion in a vicinity of the optical axis; and
the optical imaging lens comprises no other lenses having refracting power beyond the first to the fifth lens elements.

2. The optical imaging lens according to claim 1, wherein a central thickness of the first lens element along the optical axis is represented by T1, a central thickness of the second lens element along the optical axis is represented by T2, a central thickness of the third lens element along the optical axis is represented by T3, an air gap between the second lens element and the third lens element along the optical axis is represented by G23, and wherein the optical imaging lens further satisfies an inequality: $(T2+G23+T3)/T1 \leq 2.100$.

3. The optical imaging lens according to claim 1, wherein a sum of air gaps from the first to the fifth lens elements along the optical axis is represented by AAG, a central thickness of the third lens element along the optical axis is represented by T3, and wherein the optical imaging lens further satisfies an inequality: $AAG/T3 \leq 1.800$.

4. The optical imaging lens according to claim 1, wherein a central thickness of the fourth lens element along the optical axis is represented by T4, a central thickness of the fifth lens element along the optical axis is represented by T5, an air gap between the fourth lens element and the fifth lens element along the optical axis is represented by G45, and wherein the optical imaging lens further satisfies an inequality: $(T4+G45+T5)/T4 \leq 2.300$.

5. The optical imaging lens according to claim 1, wherein an effective focal length of the optical imaging lens is represented by EFL, a central thickness of the first lens element along the optical axis is represented by T1, and wherein the optical imaging lens further satisfies an inequality: $EFL/T1 \leq 6.800$.

6. The optical imaging lens according to claim 1, wherein a sum of central thicknesses from the first to the fifth lens elements along the optical axis is represented by ALT, a central thickness of the fifth lens element along the optical axis is represented by T5, and wherein the optical imaging lens further satisfies an inequality: $ALT/T5 \leq 10.000$.

7. The optical imaging lens according to claim 1, wherein a distance from the object-side surface of the first lens element to the image-side surface of the fifth lens element along the optical axis is represented by TL, an air gap between the third lens element and the fourth lens element along the optical axis is represented by G34, and the optical imaging lens further satisfies an inequality: $TL/G34 \leq 10.000$.

8. An optical imaging lens, sequentially from an object side to an image side along an optical axis, comprising first, second, third, fourth, and fifth lens elements, each of the first, second, third, fourth, and fifth lens elements having an object-side surface facing toward the object side, an image-side surface facing toward the image side, wherein:
the image-side surface of the first lens element comprises a concave portion in a vicinity of the optical axis;
the object-side surface of the second lens element comprises a concave portion in a vicinity of the optical axis;
the third lens element has positive refracting power, the object-side surface of the third lens element comprises a concave portion in a vicinity of a periphery of the third lens element, and the image-side surface of the third lens element comprises a convex portion in a vicinity of the optical axis;
the fourth lens element has positive refracting power, and the object-side surface of the fourth lens element comprises a convex portion in a vicinity of a periphery of the fourth lens element;
the image-side surface of the fifth lens element comprises a concave portion in a vicinity of the optical axis and a convex portion in a vicinity of a periphery of the fifth lens element; and
the optical imaging lens may comprise no other lenses having refracting power beyond the first to the fifth lens elements.

9. The optical imaging lens according to claim 8, wherein a central thickness of the second lens element along the optical axis is represented by T2, a central thickness of the third lens element along the optical axis is represented by T3, an air gap between the second lens element and the third lens element along the optical axis is represented by G23, and the optical imaging lens further satisfies an inequality: $(T2+G23+T3)/T3 \leq 1.900$.

10. The optical imaging lens according to claim 8, wherein a sum of air gaps from the first to the fifth lens elements along the optical axis is represented by AAG, an air gap between the third lens element and the fourth lens element along the optical axis is represented by G34, and the optical imaging lens further satisfies an inequality: $AAG/G34 \leq 3.300$.

11. The optical imaging lens according to claim 8, wherein a central thickness of the first lens element along the optical axis is represented by T1, a central thickness of the fourth lens element along the optical axis is represented by T4, a central thickness of the fifth lens element along the optical axis is represented by T5, an air gap between the fourth lens element and the fifth lens element along the optical axis is represented by G45, and the optical imaging lens further satisfies an inequality: $(T4+G45+T5)/T1 \leq 2.700$.

12. The optical imaging lens according to claim 8, wherein an effective focal length of the optical imaging lens is represented by EFL, a central thickness of the fourth lens element along the optical axis is represented by T4, and the optical imaging lens further satisfies an inequality: $EFL/T4 \leq 5.900$.

13. The optical imaging lens according to claim 8, wherein a sum of central thicknesses from the first to the fifth lens elements along the optical axis is represented by ALT, a central thickness of the first lens element along the optical axis is represented by T1, and the optical imaging lens further satisfies an inequality: $ALT/T1 \leq 5.200$.

14. The optical imaging lens according to claim 8, wherein a distance from the object-side surface of the first lens element to the image-side surface of the fifth lens element along the optical axis is represented by TL, a distance from the image-side surface of the fifth lens element to an image plane along the optical axis is represented by BFL, and the optical imaging lens further satisfies an inequality: TL/BFL≤6.400.

15. An optical imaging lens, sequentially from an object side to an image side along an optical axis, comprising first, second, third, fourth, and fifth lens elements, each of the first, second, third, fourth, and fifth lens elements having an object-side surface facing toward the object side, an image-side surface facing toward the image side, wherein:
the image-side surface of the first lens element comprises a concave portion in a vicinity of the optical axis;
the object-side surface of the second lens element comprises a concave portion in a vicinity of the optical axis, the image-side surface of the second lens element comprises a concave portion in a vicinity of the optical axis;
the third lens element has positive refracting power, the image-side surface of the third lens element comprises a convex portion in a vicinity of the optical axis;
the fourth lens element has positive refracting power;
the image-side surface of the fifth lens element comprises a concave portion in a vicinity of the optical axis; and
the optical imaging lens may comprise no other lenses having refracting power beyond the first to the fifth lens elements, a distance between the object-side surface of the first lens element and an image plane along the optical axis is represented by TTL, a distance from the image-side surface of the fifth lens element to an image plane along the optical axis is represented by BFL, a distance from the object-side surface of the first lens element to the image-side surface of the fifth lens element along the optical axis is represented by TL, an air gap between the first lens element and the second lens element along the optical axis is represented by G12, and the optical imaging lens further satisfies an inequality:

$TTL/BFL \leq 3.900$; and $TL/G12 \leq 10.000$.

16. The optical imaging lens according to claim 15, wherein a central thickness of the second lens element along the optical axis is represented by T2, a central thickness of the third lens element along the optical axis is represented by T3, an air gap between the second lens element and the third lens element along the optical axis is represented by G23, an air gap between the third lens element and the fourth lens element along the optical axis is represented by G34, and the optical imaging lens further satisfies an inequality: (T2+G23+T3)/G34≤2.500.

17. The optical imaging lens according to claim 15, wherein a sum of air gaps from the first to the fifth lens elements along the optical axis is represented by AAG, a central thickness of the first lens element along the optical axis is represented by T1, and the optical imaging lens further satisfies an inequality: AAG/T1≤2.600.

18. The optical imaging lens according to claim 15, wherein a central thickness of the fourth lens element along the optical axis is represented by T4, and the optical imaging lens further satisfies an inequality: TTL/T4≤8.300.

19. The optical imaging lens according to claim 15, wherein a central thickness of the second lens element along the optical axis is represented by T2, and the optical imaging lens further satisfies an inequality: G12/T2≤1.800.

20. The optical imaging lens according to claim 15, wherein a central thickness of the fifth lens element along the optical axis is represented by T5, and the optical imaging lens further satisfies an inequality: T5/G12≤2.300.

* * * * *